US012252380B1

(12) United States Patent
Crook

(10) Patent No.: US 12,252,380 B1

(45) Date of Patent: Mar. 18, 2025

(54) WORK PLATFORM HAVING ATTACHED MOVABLE WORK STEP

(71) Applicant: California Manufacturing & Engineering Company, LLC, Kerman, CA (US)

(72) Inventor: Gary Crook, Fresno, CA (US)

( * ) Notice: Subject to any disclaimer, the term of this patent is extended or adjusted under 35 U.S.C. 154(b) by 1117 days.

(21) Appl. No.: 17/062,572

(22) Filed: Oct. 3, 2020

Related U.S. Application Data

(63) Continuation-in-part of application No. 16/275,854, filed on Feb. 14, 2019.

(60) Provisional application No. 62/663,465, filed on Apr. 27, 2018, provisional application No. 62/913,189, filed on Oct. 10, 2019.

(51) Int. Cl.

| | |
|---|---|
| ***B66F 11/04*** | (2006.01) |
| ***B66F 13/00*** | (2006.01) |
| ***B66F 17/00*** | (2006.01) |

(52) U.S. Cl.
CPC .............. *B66F 11/04* (2013.01); *B66F 13/00* (2013.01); *B66F 17/006* (2013.01); *B66F 11/042* (2013.01)

(58) Field of Classification Search
CPC ....... B66F 11/00; B66F 11/042; B66F 11/044; B66F 11/046; B66F 11/048; B66F 13/00; B66F 17/00; B66F 17/006; B66F 11/04
See application file for complete search history.

(56) References Cited

U.S. PATENT DOCUMENTS 366,365 A * 7/1887 Averberg ................ B66F 11/04 52/109
543,196 A * 7/1895 Stevens, Jr. ............ A47B 91/04 4/594

(Continued)

FOREIGN PATENT DOCUMENTS

AT 406359 B 4/2000
CN 104591051 A1 5/2015

(Continued)

OTHER PUBLICATIONS

UpRight, "UpRight X26 Ultra-N Scissor Lift", brochure, Internet.

(Continued)

*Primary Examiner* — Colleen M Chavchavadze
*Assistant Examiner* — Shiref M Mekhaeil
(74) *Attorney, Agent, or Firm* — Sierra IP Law, PC; William K. Nelson

(57) ABSTRACT

A work platform for use with an aerial work platform to accomplish a work activity at an elevated location. The work platform has a deck with a floor, an upwardly extending guardrail assembly around the floor and a work step pivotally attached to the guardrail assembly to move between a vertical storage position and a horizontal work position to allow a worker to reach higher than possible from the floor. A step support mechanism supports the work step in its work position. The step support mechanism can be support legs that contact the floor or cables which are connected to the guardrail assembly. The guardrail assembly has a movable upper assembly that is moved upward for safe use of the work step. The aerial work platform has a self-propelled chassis and a lift mechanism that move and elevate the work platform using operator controls on the work platform.

13 Claims, 15 Drawing Sheets

(56) References Cited

U.S. PATENT DOCUMENTS

| | | | | | | |
|---|---|---|---|---|---|---|
| 1,439,388 | A | * | 12/1922 | Willett | E06C 1/393 | 182/15 |
| 1,579,115 | A | * | 3/1926 | Bailey | A47C 17/38 | 5/174 |
| 1,887,283 | A | * | 11/1932 | Brabson | A47B 91/12 | 248/346.11 |
| 2,257,211 | A | * | 9/1941 | Willoughby | B60N 2/3047 | 297/14 |
| 2,581,488 | A | * | 1/1952 | Keltner | E06C 9/08 | 182/77 |
| 2,625,443 | A | | 1/1953 | Sensenbaugh | | |
| 2,850,080 | A | * | 9/1958 | Meaney | A47C 16/04 | 297/423.16 |
| 3,017,968 | A | | 1/1962 | Horice | | |
| 3,030,166 | A | * | 4/1962 | Baker | A47B 77/10 | 312/235.1 |
| 3,112,010 | A | * | 11/1963 | Mihalik | E06C 1/397 | 182/15 |
| 3,181,711 | A | | 5/1965 | Stockton | | |
| 3,190,391 | A | | 6/1965 | Hoard | | |
| 3,265,156 | A | * | 8/1966 | Jacobs | E04H 3/16 | 182/113 |
| 3,395,648 | A | * | 8/1968 | Karr | B66B 21/10 | 198/321 |
| 3,509,965 | A | | 5/1970 | Mitchell | | |
| 3,596,735 | A | * | 8/1971 | Denier | B66F 11/042 | 182/69.5 |
| 3,638,757 | A | | 2/1972 | Sampson | | |
| 3,664,458 | A | * | 5/1972 | Sterns | E06C 1/39 | 182/180.2 |
| 3,709,322 | A | | 1/1973 | Mitchell | | |
| 3,834,488 | A | | 9/1974 | Grove | | |
| 3,893,540 | A | | 7/1975 | Beucher | | |
| 3,899,037 | A | | 8/1975 | Yuker | | |
| 4,009,903 | A | * | 3/1977 | Manspeaker | A47C 4/06 | 297/14 |
| 4,019,604 | A | | 4/1977 | Benson | | |
| 4,064,999 | A | * | 12/1977 | Young | E04F 21/1811 | 52/749.1 |
| 4,157,129 | A | * | 6/1979 | Christopher | E04G 3/20 | 182/148 |
| 4,175,644 | A | | 11/1979 | Dick | | |
| 4,271,926 | A | | 6/1981 | Cullity | | |
| 4,356,887 | A | * | 11/1982 | Fisher | B66F 11/042 | 182/69.5 |
| 4,395,191 | A | | 7/1983 | Kaiser | | |
| 4,456,093 | A | | 6/1984 | Finley et al. | | |
| 4,482,287 | A | | 11/1984 | Menzi | | |
| 4,484,663 | A | | 11/1984 | Wyse | | |
| 4,494,465 | A | * | 1/1985 | Fick, Jr. | A47B 3/083 | 108/131 |
| 4,511,015 | A | | 4/1985 | Purdy | | |
| 4,558,758 | A | | 12/1985 | Littman | | |
| 4,558,847 | A | * | 12/1985 | Coates | B66F 7/0625 | 254/9 C |
| 4,598,797 | A | | 7/1986 | Schultz | | |
| 4,599,030 | A | | 7/1986 | Skaalen et al. | | |
| 4,690,247 | A | | 9/1987 | Yoshida | | |
| 4,708,221 | A | * | 11/1987 | Kubiak | A45F 3/26 | 248/217.4 |
| 4,757,875 | A | | 7/1988 | Hade | | |
| 4,775,029 | A | | 10/1988 | MacDonald et al. | | |
| 4,779,691 | A | | 10/1988 | Werdner | | |
| 4,826,030 | A | | 5/1989 | Valley | | |
| 4,883,145 | A | * | 11/1989 | Deltatto | B66F 11/044 | 182/2.4 |
| 5,062,500 | A | | 11/1991 | Miller | | |
| 5,082,085 | A | | 1/1992 | Ream et al. | | |
| 5,085,290 | A | * | 2/1992 | Guirlinger | E06C 1/005 | 182/91 |
| 5,086,874 | A | * | 2/1992 | Treants | A01M 31/02 | 182/136 |
| 5,094,515 | A | * | 3/1992 | Low | A47B 46/005 | 182/91 |
| 5,137,101 | A | | 8/1992 | Schneff | | |
| 5,143,177 | A | * | 9/1992 | Smith | A01M 31/02 | 182/136 |
| 5,143,400 | A | | 9/1992 | Miller | | |
| 5,148,885 | A | | 9/1992 | Weyer | | |
| 5,158,023 | A | * | 10/1992 | Allen | E04G 5/00 | 182/120 |
| 5,159,989 | A | | 11/1992 | Claxton | | |
| 5,242,032 | A | | 9/1993 | Prestwood | | |
| 5,269,393 | A | | 12/1993 | Luscombe | | |
| 5,297,844 | A | * | 3/1994 | Haustein | A01M 31/025 | 296/190.04 |
| 5,330,245 | A | * | 7/1994 | Boisset | B60N 2/01583 | 296/65.03 |
| 5,355,970 | A | | 10/1994 | Hade | | |
| 5,358,067 | A | * | 10/1994 | Ford | E06C 1/005 | 182/35 |
| 5,380,262 | A | * | 1/1995 | Austin | A61H 3/04 | 482/68 |
| 5,381,872 | A | * | 1/1995 | Peruzzi | E04G 1/18 | 182/63.1 |
| 5,409,083 | A | * | 4/1995 | Thompson | A45F 3/26 | 182/187 |
| 5,427,197 | A | | 6/1995 | Waters | | |
| 5,460,246 | A | | 10/1995 | Burch | | |
| 5,476,050 | A | | 12/1995 | Zimmer et al. | | |
| 5,513,900 | A | * | 5/1996 | Iglesias | A47C 7/002 | 248/501 |
| 5,547,038 | A | | 8/1996 | Madwed | | |
| 5,547,205 | A | * | 8/1996 | do Rosario Sousa de Cabedo | B62B 5/085 | 297/14 |
| 5,570,754 | A | | 11/1996 | Stimson | | |
| 5,662,368 | A | * | 9/1997 | Ito | B60N 2/01583 | 296/65.09 |
| 5,685,173 | A | | 11/1997 | DeL'isle et al. | | |
| 5,695,173 | A | | 12/1997 | Ochoa et al. | | |
| 5,743,149 | A | | 4/1998 | Cullity | | |
| 5,775,869 | A | | 7/1998 | Bishop | | |
| 5,868,218 | A | * | 2/1999 | Lawson | B66F 11/044 | 182/69.6 |
| 5,899,036 | A | * | 5/1999 | Seiber | E04B 2/7455 | 52/243 |
| 5,913,379 | A | | 6/1999 | Young et al. | | |
| 5,967,255 | A | * | 10/1999 | Young | A47B 5/06 | 297/14 |
| 6,044,927 | A | * | 4/2000 | Newlin | B66F 11/042 | 182/69.5 |
| 6,044,961 | A | * | 4/2000 | Hine | B65G 17/08 | 40/526 |
| 6,050,660 | A | | 4/2000 | Gurley | | |
| 6,105,721 | A | * | 8/2000 | Haynes | A01M 31/025 | 182/127 |
| 6,119,882 | A | | 9/2000 | Crook et al. | | |
| 6,176,341 | B1 | | 1/2001 | Ansari et al. | | |
| 6,272,413 | B1 | | 8/2001 | Takahashi | | |
| 6,283,483 | B1 | | 9/2001 | Johnson et al. | | |
| 6,293,579 | B1 | | 9/2001 | Schaeff | | |
| 6,301,534 | B1 | | 10/2001 | McDermott et al. | | |
| 6,336,520 | B1 | * | 1/2002 | Amacker | A01M 31/02 | 182/135 |
| 6,367,585 | B1 | * | 4/2002 | Fast | A01M 31/02 | 182/135 |
| 6,371,142 | B1 | * | 4/2002 | Battiston | A61H 3/04 | 135/66 |
| 6,386,321 | B1 | * | 5/2002 | Muhich | A63B 27/00 | 182/135 |
| 6,405,114 | B1 | | 6/2002 | Priestley | | |
| 6,431,632 | B1 | * | 8/2002 | Kozikowski | B60N 2/01583 | 297/336 |
| 6,443,687 | B1 | | 9/2002 | Kaiser | | |
| 6,480,778 | B2 | | 11/2002 | Tanaka et al. | | |
| 6,488,161 | B1 | | 12/2002 | Bean | | |
| 6,540,039 | B1 | | 4/2003 | Yu et al. | | |
| 6,564,955 | B2 | | 5/2003 | Franzen | | |

(56) References Cited

U.S. PATENT DOCUMENTS 6,595,530 B2 * 7/2003 Wood ........................ A61H 3/04 280/42
6,827,176 B2 12/2004 Bean et al.
6,866,120 B1 * 3/2005 Butterworth .......... A01M 31/02 182/135
6,883,641 B2 4/2005 Julien
7,004,286 B2 2/2006 Fredette
7,065,436 B2 6/2006 Hara
7,198,278 B2 4/2007 Donaldson
7,246,684 B2 7/2007 Bean
7,425,004 B2 9/2008 Donaldson
7,448,470 B2 * 11/2008 Brown .................. B66F 11/042 182/69.5
7,631,714 B2 12/2009 Dower
7,648,002 B2 1/2010 Easton et al.
7,717,210 B2 5/2010 Mahy et al.
7,823,694 B2 * 11/2010 Motes .................. A01M 31/02 182/187
7,832,741 B2 11/2010 Donaldson
7,971,685 B2 * 7/2011 Simone ................ A01M 31/02 182/136
7,992,659 B2 8/2011 Schaedler et al.
8,073,592 B2 12/2011 Nishimori et al.
8,103,418 B2 1/2012 Osswald et al.
8,123,300 B2 * 2/2012 Stoffer ................ A47D 15/006 108/106
8,215,441 B2 7/2012 Wierzba et al.
8,262,109 B1 9/2012 Bell et al.
8,267,222 B2 * 9/2012 Cui ...................... B66F 11/042 182/69.5
8,332,089 B2 12/2012 Nakazawa
8,392,068 B2 3/2013 Yamazaki
8,490,747 B2 * 7/2013 Winslow ................ E04G 5/003 182/119
8,505,684 B1 * 8/2013 Bogue .................. B66F 11/042 182/69.5
8,522,920 B1 * 9/2013 Salyer .................. A01M 31/02 182/187
8,622,170 B2 1/2014 Bean
8,627,925 B2 1/2014 Webster
8,631,902 B2 1/2014 Crook
8,651,237 B2 * 2/2014 Pulliam .................. E02F 3/962 182/141
8,678,135 B2 * 3/2014 Crook .................. B66F 11/042 182/69.6
8,789,653 B2 * 7/2014 Priest .................... A01M 31/02 182/100
8,888,122 B2 11/2014 Berry
9,108,831 B2 * 8/2015 Beji ........................ B66F 11/04
9,174,488 B2 11/2015 Berry
9,212,038 B1 12/2015 Presti
9,238,477 B2 1/2016 Ahern et al.
9,245,434 B2 1/2016 Baillargeon
9,254,865 B2 2/2016 Schaedler et al.
9,254,866 B2 2/2016 Dawson et al.
9,366,042 B2 * 6/2016 Weston .................... E04G 1/30
9,387,881 B2 7/2016 Smith
9,394,112 B2 * 7/2016 Andreoli .............. B65G 17/385
9,434,412 B2 9/2016 Clark
9,499,348 B2 11/2016 Teichrob
9,617,788 B2 * 4/2017 Goodson ................ E06C 1/005
9,883,741 B2 * 2/2018 Demasi, III ......... A47B 46/005
9,938,732 B1 * 4/2018 Hay, Jr. .................... E04G 1/24
9,986,732 B1 * 6/2018 Pope .................... A01M 31/02
10,004,651 B2 6/2018 DeLuca et al.
10,060,142 B2 8/2018 Haessler et al.
10,118,810 B2 11/2018 Ahern et al.
10,322,920 B2 * 6/2019 Shi ........................ B66F 17/006
D856,623 S * 8/2019 Jilbert ............................ D34/28
D859,773 S * 9/2019 Beamish ........................ D34/28
10,427,926 B2 10/2019 Mourlam
10,472,175 B2 * 11/2019 Minoura ................ B65G 17/34
10,520,241 B1 12/2019 Nelson
10,787,192 B1 9/2020 Katzourakis et al.
10,810,851 B2 10/2020 Baillargeon
10,857,058 B1 * 12/2020 Casibang ................. A61H 3/04
10,912,293 B1 * 2/2021 Miller ................... A01M 31/02
10,918,203 B1 * 2/2021 Schneider .............. H01R 33/05
11,007,944 B1 * 5/2021 Hanser ...................... E04G 5/14
11,247,886 B2 2/2022 Fritel et al.
11,311,779 B2 * 4/2022 Hines .................... A01M 31/02
11,661,319 B2 5/2023 Mellott
2002/0027042 A1 3/2002 Beji
2004/0062630 A1 4/2004 Marrero
2004/0129491 A1 7/2004 Bean et al.
2004/0149498 A1 8/2004 Nakashima
2005/0056484 A1 * 3/2005 Fredette .................. B66F 11/04 182/62.5
2005/0110262 A1 5/2005 LeBlanc et al.
2005/0183896 A1 8/2005 Fenelli et al.
2005/0189168 A1 9/2005 Bean
2006/0151252 A1 7/2006 Joos
2006/0225955 A1 10/2006 Murphy
2007/0175702 A1 * 8/2007 Simone ................ A01M 31/02 182/187
2007/0187184 A1 * 8/2007 Nasuti .................. B66F 11/042 182/69.5
2007/0261919 A1 * 11/2007 Roe ...................... A01M 31/02 182/187
2008/0030037 A1 * 2/2008 Lombardi ............... E04G 1/362 296/3
2008/0087484 A1 4/2008 Fenelli et al.
2008/0097666 A1 4/2008 Oba et al.
2008/0105498 A1 * 5/2008 Perkins ................ B66F 11/042 187/269
2008/0149420 A1 * 6/2008 Cheatham ................. B60R 9/06 182/63.1
2008/0302601 A1 * 12/2008 Baker ...................... B66B 9/16 182/127
2009/0218166 A1 * 9/2009 Newton .................. E04G 5/003 182/129
2009/0321186 A1 * 12/2009 Louchart .............. A01M 31/02 182/188
2010/0106375 A1 4/2010 Ahmed et al.
2010/0193290 A1 * 8/2010 Cui ...................... B66F 11/042 182/69.5
2010/0200332 A1 8/2010 Bowden
2010/0224343 A1 9/2010 Fukuma et al.
2011/0224872 A1 9/2011 Reed
2012/0006619 A1 * 1/2012 DuBose .................... E04G 1/18 182/113
2012/0024629 A1 * 2/2012 Berry, Jr. ............... A01D 46/20 182/113
2012/0043159 A1 2/2012 Clark et al.
2012/0181144 A1 * 7/2012 Turek ...................... B66B 23/08 198/330
2012/0186908 A1 * 7/2012 Crook ...................... E04G 1/22 182/69.5
2012/0217091 A1 * 8/2012 Baillargeon ........... G08B 21/02 182/18
2013/0144476 A1 6/2013 Pinto et al.
2013/0184960 A1 7/2013 Wetterer et al.
2014/0020978 A1 * 1/2014 Weston ..................... E04G 1/30 182/102
2014/0084641 A1 * 3/2014 Moody .................... A61G 5/08 297/16.1
2014/0110190 A1 4/2014 Sollers
2014/0303846 A1 10/2014 Hayama et al.
2015/0134202 A1 5/2015 Dawson et al.
2015/0210520 A1 7/2015 Ahearn et al.
2015/0246684 A1 9/2015 Ahearn et al.
2016/0069094 A1 * 3/2016 Lombardi ............... E04G 3/243 182/222
2016/0178123 A1 6/2016 Beaver
2017/0202727 A1 * 7/2017 Wegener .................. A61H 3/00
2018/0057333 A1 * 3/2018 Gale ....................... B66F 11/04
2018/0162708 A1 6/2018 Pithoud
2018/0251354 A1 * 9/2018 Mohlman ............. B66F 9/0755
2018/0354762 A1 * 12/2018 Altizer .................... B66F 11/04
2019/0194007 A1 6/2019 Mourlam
2019/0210852 A1 7/2019 Fritel et al.

(56) References Cited

U.S. PATENT DOCUMENTS

| | | | | |
|---|---|---|---|---|
| 2019/0309901 | A1* | 10/2019 | Crook | F16N 31/006 |
| 2019/0322511 | A1 | 10/2019 | Penicaud et al. | |
| 2019/0330034 | A1 | 10/2019 | Crook | |
| 2019/0336828 | A1* | 11/2019 | Hines | A01M 31/02 |
| 2020/0003607 | A1* | 1/2020 | Bafile | B66F 17/006 |
| 2020/0317256 | A1 | 10/2020 | Hao et al. | |
| 2020/0317489 | A1* | 10/2020 | Bhatia | B66F 11/042 |
| 2020/0317494 | A1 | 10/2020 | Bafile et al. | |
| 2021/0017774 | A1* | 1/2021 | Phan | E04G 21/3228 |
| 2021/0180345 | A1 | 6/2021 | Pietila et al. | |
| 2021/0188345 | A1 | 6/2021 | St-Germain et al. | |
| 2021/0221450 | A1 | 7/2021 | Sobotka et al. | |
| 2021/0276849 | A1 | 9/2021 | Shafer et al. | |
| 2022/0135381 | A1 | 5/2022 | Mellott | |

FOREIGN PATENT DOCUMENTS

| | | | |
|---|---|---|---|
| CN | 207618972 | U | 7/2018 |
| DE | 4120584 | A1 | 12/1992 |
| EP | 0525903 | A1 | 2/1993 |
| EP | 0624500 | A1 | 11/1994 |
| EP | 1350755 | A1 | 10/2003 |
| EP | 1491489 | A2 | 12/2004 |
| EP | 2213549 | A1 | 8/2010 |
| EP | 2641860 | A1 | 9/2013 |
| EP | 2479135 | B1 | 5/2016 |
| EP | 3023544 | A1 | 5/2016 |
| FR | 2266656 | A1 | 10/1975 |
| FR | 2626865 | A1 | 8/1989 |
| FR | 2701940 | A1 | 9/1994 |
| FR | 2703673 | A1 | 10/1994 |
| GB | 1504969 | | 3/1978 |
| GB | 2479202 | A | 10/2011 |
| JP | 2011032083 | A | 2/2011 |
| KR | 200419510 | Y1 | 6/2006 |
| NL | 1013468 | C2 | 5/2001 |
| WO | 2019072379 | A1 | 4/2019 |
| WO | 2019189095 | A1 | 10/2019 |
| WO | 2019189097 | A1 | 10/2019 |
| WO | 2019189101 | A1 | 10/2019 |

OTHER PUBLICATIONS

Man Lift, "SHU Scissor Lift Attachment", brochure, Internet.

English Abstract of CN104591051 retrieved from Espacenet at https://worldwide.espacenet.com/patent/search/family/053117180/publication/CN104591051A?q=pn%3DCN104591051A.

Lateral control strategy for autonomous steering of Ackerman-like vehicles, retrieved Nov. 9, 2022 from "https://www.sciencedirect.com/science/article/abs/pii/S0921889003001519".

Differential Speed Steering Control for Four-Wheel Independent Driving Electric Vehicle from International Journal of Materials, Mechanics and Manufacturing, vol. 1, No. 4, Nov. 2013 retrieved Nov. 9, 2022 from "https://ieeexplore.ieee.org/abstract/document/6563667".

European Search Report for European patent application EP1917046 retrieved Nov. 10, 2022 from "https://worldwide.espacenet.com/patent/search/family/066248550/publication/EP3560887A1?q=pn%3DUS2019330034A1".

Advertisement for Genie Lift Tools Access Deck For Scissor Lifts retrieved Nov. 9, 2022 from file history of U.S. Appl. No. 16/275,854.

Advertisement for Xstep Skyjack retrieved Nov. 9, 2022 from file history of U.S. Appl. No. 16/275,854.

UpRight X26 Ultra Narrow Scissor Lift Parts Manual retireved Nov. 10, 2022 from "https://www.epartsplus.com/media/pdf/documentations/upright/service-parts-manuals/114102-000_X26UN-s-n%2020000-29999-Parts-only-Domestic.pdf".

Man Lift SHU Scissor Lift Attachment retireved Nov. 10, 2022 from "http://if-manlift.com/products/shu/".

English abstract for foreign patent document AT406359B.

English abstract for foreign patent document CN207618972U.

English abstract for foreign patent document EP1350755A1.

English abstract for foreign patent document EP2213549A1.

English abstract for foreign patent document KR200419510Y1.

English abstract for foreign patent document NL1013468C2.

English Abstract of DE4120584A1 retrieved from Espacenet at https://worldwide.espacenet.com/patent/search/family/006434482/publication/DE4120584A1?q=pn%3DDE4120584A1.

English Abstract of EP0525903A1 retrieved from Espacenet at https://worldwide.espacenet.com/patent/search/family/006436182/publication/EP0525903A1?q=pn%3DEP0525903A1.

English Abstract of EP0624500A1 retrieved from Espacenet at https://worldwide.espacenet.com/patent/search/family/006488406/publication/EP0624500A1?q=pn%3DEP0624500A1.

English Abstract of FR2266656A1 retrieved from Espacenet at https://worldwide.espacenet.com/patent/search/family/009137215/publication/FR2266656A1?q=pn%3DFR2266656A1.

English Abstract of FR2626865A1 retrieved from Espacenet at https://worldwide.espacenet.com/patent/search/family/009363066/publication/FR2626865A1?q=pn%3DFR2626865A1.

English Abstract of FR2701940A1 retrieved from Espacenet at https://worldwide.espacenet.com/patent/search/family/009444843/publication/FR2701940A1?q=pn%3DFR2701940A1.

English Abstract of JP2011032083A retrieved from Espacenet at https://worldwide.espacenet.com/patent/search/family/043761539/publication/JP2011032083A?q=pn%3DJP2011032083A.

Manitou 150 TP, Wheeled Telescopic Boom Lifts (2007-2012) Specifications, retrieved Nov. 25, 2024 from https://www.lectura-specs.com/en/model/aerial-work-platform/telescopic-boom-lifts-wheeled-telescopic-boom-lifts-manitou/150-tp-1042552.

* cited by examiner

WORK PLATFORM HAVING ATTACHED MOVABLE WORK STEP

CROSS-REFERENCE TO RELATED APPLICATIONS

This patent application claims priority to U.S. Provisional Application No. 62/913,189 filed Oct. 10, 2019 and is a continuation-in-part of U.S. patent application Ser. No. 16/275,854 filed Feb. 14, 2019, which claimed priority to U.S. Provisional Application No. 62/663,465 filed Apr. 27, 2018.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The present invention relates to self-propelled aerial work platforms having a work platform with a deck with a peripherally disposed guardrail to allow a person to safely perform elevated work activity. In particular, the present invention relates to small sized aerial work platforms that are configured that are controllable and movable by an operator standing on the deck. Even more particularly, the present invention relates to such aerial work platforms that are configured to allow the operator to reach higher locations without further raising the work platform.

B. Background

Machines for raising a work platform to a desired height so a person who is on or otherwise using the work platform may perform a work activity at the raised height are well known in the art. In fact, such machines have been in use for many years to raise personnel and materials to a height where a work activity needs to be performed. Such machines are generally referred to as aerial work platforms. One common type of aerial work platform is a scissor lift machine which has a self-propelled chassis and a scissor-configured lifting mechanism that allow the operator to move the machine to a work location and then raise and lower the horizontally disposed work platform. Scissor lift machines are in widespread use in warehouses, construction sites and various other job locations. Although scissor lift machines are widely available and generally very useful for vertically raising and lowering personnel and materials, the ability to safely and effectively use such machines inside the interior of a building or other structure having a low overhead ceiling is often limited due to the need to fit the machine into the structure and to move the machine around inside the structure.

With the increasing use of low-level aerial work platforms to perform elevated work activities in safer and more productive methods, there is a need for means to move through low overhead openings. A typical application is the need to work on utility services such as electric and communication cables, water and gas pipes and the like which are secured to structural ceilings having drop ceilings suspended below the utilities. Because the access openings in the drop ceiling are typically less than twenty-four inches wide, the guardrails which surround the deck of the work platform restrict the ability to elevate the platform above the suspended drop ceiling. The size restriction of these openings prevents the worker from being able to conveniently reach the utilities which are located above the drop ceiling for installation, replacement or repair of those utilities. This limitation causes workers to risk standing on the mid-rail of the work platform guardrail or use a small ladder on the platform, both of which are unsafe and forbidden practices. The traditional solution is the use of a specialized "push around" personnel lift that typically has a small platform. By definition these lifts are not self-propelled. A further limitation of the push around platform type lift is that once the lift is positioned and the platform stabilizing outriggers have been set, the vertical projection of the platform is fixed in place. As well known in the art, re-positioning of the lift and re-deployment of the outriggers may be necessary to allow a worker to enter through a tight overhead opening in the drop ceiling.

One solution for this problem is a vertical access platform attachment called "SHU" scissor lift attachment offered by Man Lift Manufacturing Co. for use with a self-propelled scissor lift machine. The attachment, that is secured to one end of the work platform, is configured with a higher elevation deck and guardrail which allows a worker to reach higher than he or she would be able to if they were standing on the main deck of the work platform. Use of this attachment replaces the existing slide out deck and, therefore, eliminates this advantageous feature of the scissor lift machine. In addition, use of the attachment causes the scissor lift machine to be significantly longer, thereby making the machine less maneuverable in tight spaces, restricting the ability of the machine to enter a freight elevator or other small location and making it more difficult to load the machine onto a delivery vehicle. Because the attachment is somewhat heavy, securing it to a work platform reduces the lift capacity of a particular size scissor lift machine. Another limitation is that use of the attachment on a scissor lift machine generally requires that the attachment be secured to the work platform, with all of the weight, size and cost limitations set forth above, before the user even knows whether or not he or she will actually need the attachment.

What is needed, therefore, is an improved work platform for scissor lift machines and the like that allows the user of the machine to reach higher than he or she would otherwise be able to reach due to the limitations of elevating the work platform due to the guardrails around the deck of the work platform. More specifically, what is needed is an improved work platform that allows the user to easily and quickly be able to reach higher locations, such as inside an opening in a drop ceiling or the like, which he or she would not otherwise be able to reach. The improved work platform should not result in an increase in the size of the scissor lift machine or substantially reduce the lift capacity of the machine. Preferably, the improved work platform would not require the user thereof to attach anything to the work platform when the additional elevation is needed or plan ahead by attaching something in anticipation that additional elevation may be required.

SUMMARY OF THE INVENTION

The following presents a simplified summary of the disclosure of the present invention in order to provide a basic understanding of the invention to the reader. As such, this Summary is not an extensive overview of the disclosure and it does not identify key/critical elements of the invention or delineate the scope of the invention. The sole purpose of this Summary is to present some concepts disclosed herein in a simplified form as a prelude to the more detailed description that is presented later.

The use of terms such as “including”, “comprising” or “having” and variations thereof herein is meant to encompass the items listed thereafter and equivalents thereof. The terms “a” and “an” herein do not denote a limitation of quantity, but rather denote the presence of at least one of the referenced item. Further, the use of terms “first”, “second”, and “third”, and the like, herein do not denote any order, quantity, or importance, but rather are used to distinguish one element or feature of an element from another. The term “and/or,” when used herein with a list of two or more items, means that any one of the listed items can be utilized by itself or any combination of two or more of the listed items can be utilized together.

The new work platform of the present invention provides the benefits and solves the problems identified above. That is to say, the present invention is directed to a work platform having a deck and an upwardly disposed guardrail with a movable work step that is stored in an out-of-the-way raised position and is then moved to a lowered position when the user needs additional elevation to complete his or her work activity. More specifically, the new work platform of the present invention has a work step pivotally attached to the guardrail of the work platform so the work step can be moved between a generally vertically disposed raised position at or near the guardrail and a generally horizontally disposed lowered position in spaced apart relation to the deck of the work platform so the user can stand on the work step to reach higher than he or she would be able if merely standing on the deck of the work platform. In use, the improved work platform of the present invention has a work step that allows the user to easily and quickly deploy to reach higher locations, such as inside an opening in a drop ceiling or the like, than he or she would be able to reach without the work step. The improved work platform does not increase the size of the scissor lift machine and will not substantially reduce the lift capacity of the scissor lift machine. In the preferred configurations of the new work platform, the user does not need to attach the work step to the work platform when the additional elevation is needed or have to plan ahead by attaching the work step in anticipation that additional elevation may be required.

In one embodiment, the present application discloses a work platform of the type having an extension deck for use in aerial work platform work. In this embodiment, the new work platform comprises a main deck, an extension deck, separate guardrails around each of the decks and a work step that is moveably attached to the guardrails around the extension deck. In one configuration, the guardrails of the extension deck have raisable upper sections that are provided to allow the user to increase the height of these guardrails. The new work step is easily and quickly movable between a storage position when the benefits of the work step are not needed and a work position positioned above the floor of the extension deck to allow the user to reach higher than he or she would otherwise be able to reach. In a preferred configuration, when the work step is in the storage position it is upwardly orientated and positioned against or at least near the guardrails of the extension deck and when the work step is in the work position it is horizontally orientated in spaced apart relation to the extension deck. In another embodiment, the work platform does not have an extension deck. In this embodiment, the work step is moveably attached to the guardrails around the main deck, which guardrails have raisable upper sections that are provided to allow the user to increase the height of these guardrails. In either embodiment, the work platform is particularly adapted for use on a small aerial work apparatus having a self-propelled chassis and lifting mechanism, such as a scissor lift, on the chassis for elevating the work platform to a raised or work position. Operator controls are provided on the work platform for moving and positioning the apparatus and for elevating and lowering the work platform.

In one of the preferred embodiments of the present invention, the new work platform for use with an aerial work platform generally comprises a deck having a floor and a guardrail assembly, a work step that is associated with the guardrail assembly, one or more pivoting devices which connect the work step to a deck attachment member that is associated with the guardrail assembly, and a step support mechanism which is associated with the guardrail assembly, floor and/or work step. The guardrail assembly extends upward from the floor so as to at least partially be peripherally disposed (i.e., except for openings for ingress and egress from deck) relative to the floor. The work step is configured to be movable between a storage position wherein the work step generally does not interfere with movement on the floor and a work position in which the work step is horizontally oriented above the floor. In the work position, the work step has an upwardly disposed step surface for use by a worker who will be stepping up on the work step to reach a location he or she could not safely reach from the floor of the deck. The pivoting devices are selected to pivot the work step between its storage position and its work position relative to the floor and guardrail assembly. The step support mechanism is structured and arranged to support the work step when it is in its work position. The pivoting devices can be a hinge. In one embodiment, the step support mechanism comprises one or more flexible cables interconnecting the guardrail assembly and the work step. In another embodiment, the step support mechanism comprises one or more support legs. In one configuration, a proximal end of each of the support legs is pivotally attached to the work step so as to pivot the support legs toward the work step for storage when the work step is moved from its work position to its storage position. The work platform can have a leg engaging mechanism that is cooperatively configured to engage a distal end of the support legs when the work step is in its work position. In one configuration, the leg engaging mechanism comprise leg engaging apertures in the floor, with each one of the leg engaging apertures being cooperatively sized and configured with the distal ends of the support legs so as to engage the support legs and hold the support legs in place below the work step.

The deck can be a single or main deck where the guardrail assembly is entirely peripherally disposed, except for an access gate, around the floor of the main deck. Alternatively, the deck is an extension deck that is movably supported by a main deck so as to move between a retracted position wherein the extension deck is substantially enclosed by the main deck and an extended position wherein the extension deck extends outward from the main deck. In this configuration, the main deck and the extension deck are cooperatively configured to allow a worker to move between the main deck and the extension deck. In either configuration, the guardrails have an upper section movable between a lowered position for storage thereof and a raised position for safe use of the work step. In one embodiment, the work step and the upper section are cooperatively linked such that the work step cannot be moved from its storage position to its work position unless the upper section thereof has previously been moved from the lowered position to the raised position in order to ensure safe use of the work step.

In another embodiment, the present application discloses an aerial work platform comprising a self-propelled chassis, a work platform that is operably supported by the chassis for elevation to a work position, a lift mechanism which is associated with the chassis and operably connected to the work platform to allow an operator to elevate the work platform to a work elevation and an operator control station on the work platform that is configured for moving the aerial work platform and for elevating and lowering the work platform. The work platform, having the deck and work step is configured in the various manners that are set forth above.

Accordingly, the primary object of the present invention is to provide an improved work platform having a movable work step that has the advantages set forth above and which overcomes the disadvantages and limitations that are associated with presently available work platforms.

An important object of the present invention is to provide an improved work platform having a movable work step that is pivotally attached to a guardrail assembly of the work platform which is configured to move between a storage position at or near the guardrails of the work platform and a work position above a deck of the work platform to allow the user to reach higher than he or she would otherwise be able to if standing on the deck.

An important aspect of the present invention is that it provides a new work platform which accomplish the objectives set forth above and elsewhere in the present disclosure.

Another important aspect of the present invention is that it provides an improved work platform having a movable work step which moves between a storage position out of the user's way and a work position where the user can stand on the work step to reach higher than he or she would otherwise be able to reach without the work step.

Another important aspect of the present invention is that it provides an improved work platform having a movable work step which is pivotally attached to a guardrail assembly of the work platform to move between a storage position at or near the guardrails of the work platform and a work position above a deck of the work platform to allow the user to reach higher than he or she would otherwise be able to reach if standing on the deck.

Another important aspect of the present invention is that it provides a work platform having a movable work step pivotally attached to a guardrail around the main deck or extension deck of the work platform, with the work step being configured to move between a generally vertically orientated storage position at the guardrails and a work position in which the work step is horizontally orientated in spaced apart relation to one of the decks of the work platform.

Yet another important aspect of the present invention is that it provides a work platform having a movable work step pivotally attached to a guardrail of the work platform which allows the user to easily and quickly increase the height he or she can reach from the work platform without increasing the size of the work platform, substantially reducing the lift capacity of the work platform or requiring the user to attach the work step to the work platform.

As will be explained in greater detail by reference to the attached figures and the description of the preferred embodiments which follow, the above and other objects and aspects are accomplished or provided by the present invention. As set forth herein and will be readily appreciated by persons who are skilled in the art, the present invention resides in the novel features of form, construction, mode of operation and combination of processes presently described and understood by the claims. The description of the invention which follows is presented for purposes of illustrating one or more of the preferred embodiments of the present invention and is not intended to be exhaustive or limiting of the invention. The scope of the invention is only limited by the claims which follow after the discussion.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

Figure 1:
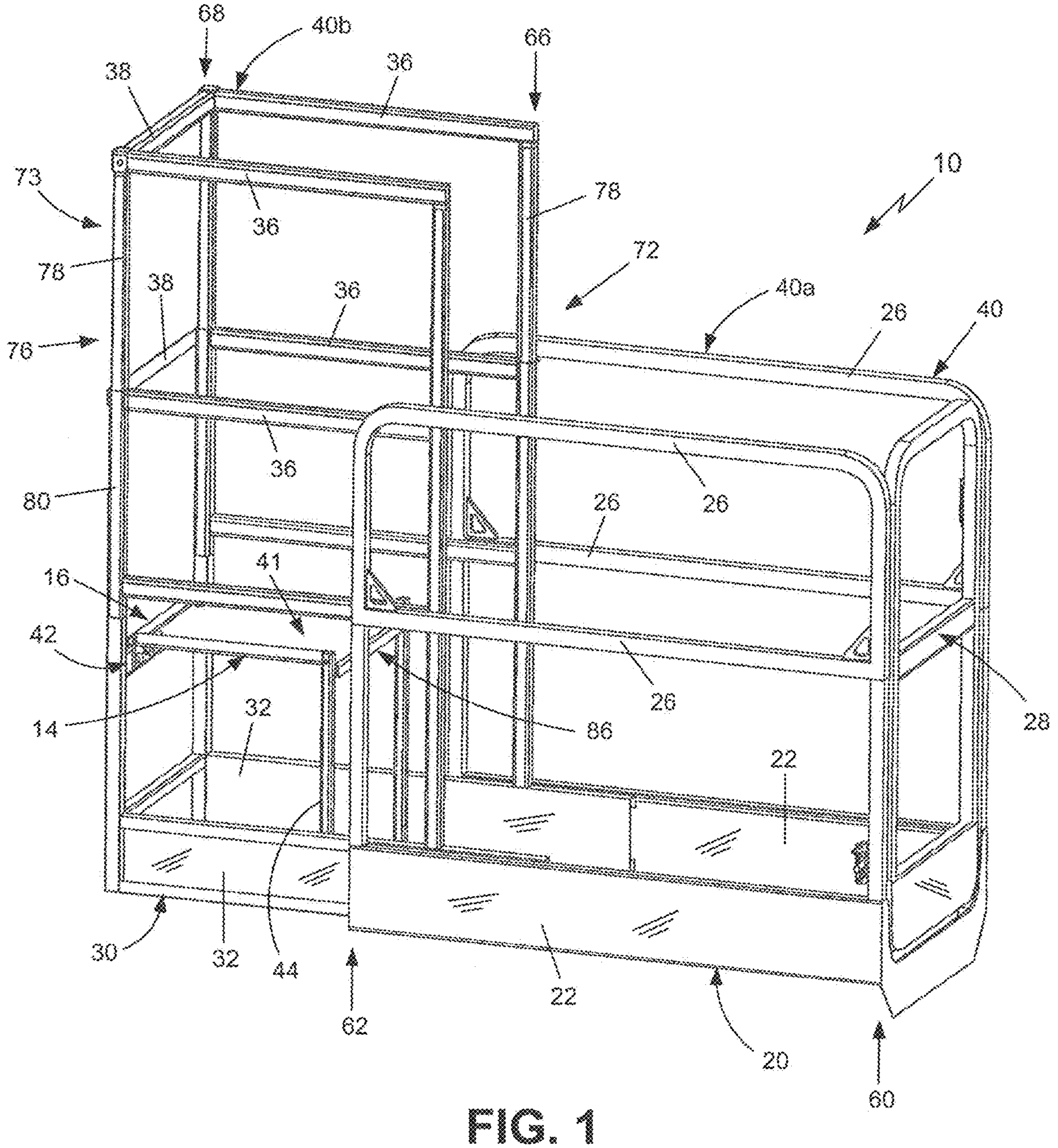
FIG. 1 is a side perspective view of a work platform that is configured according to a first embodiment of the present invention, with the work platform having a main deck, an extension deck in an extended position, an extension guardrail in a raised position and a work step supported in a work position by a pair of support legs.
Figure 2:
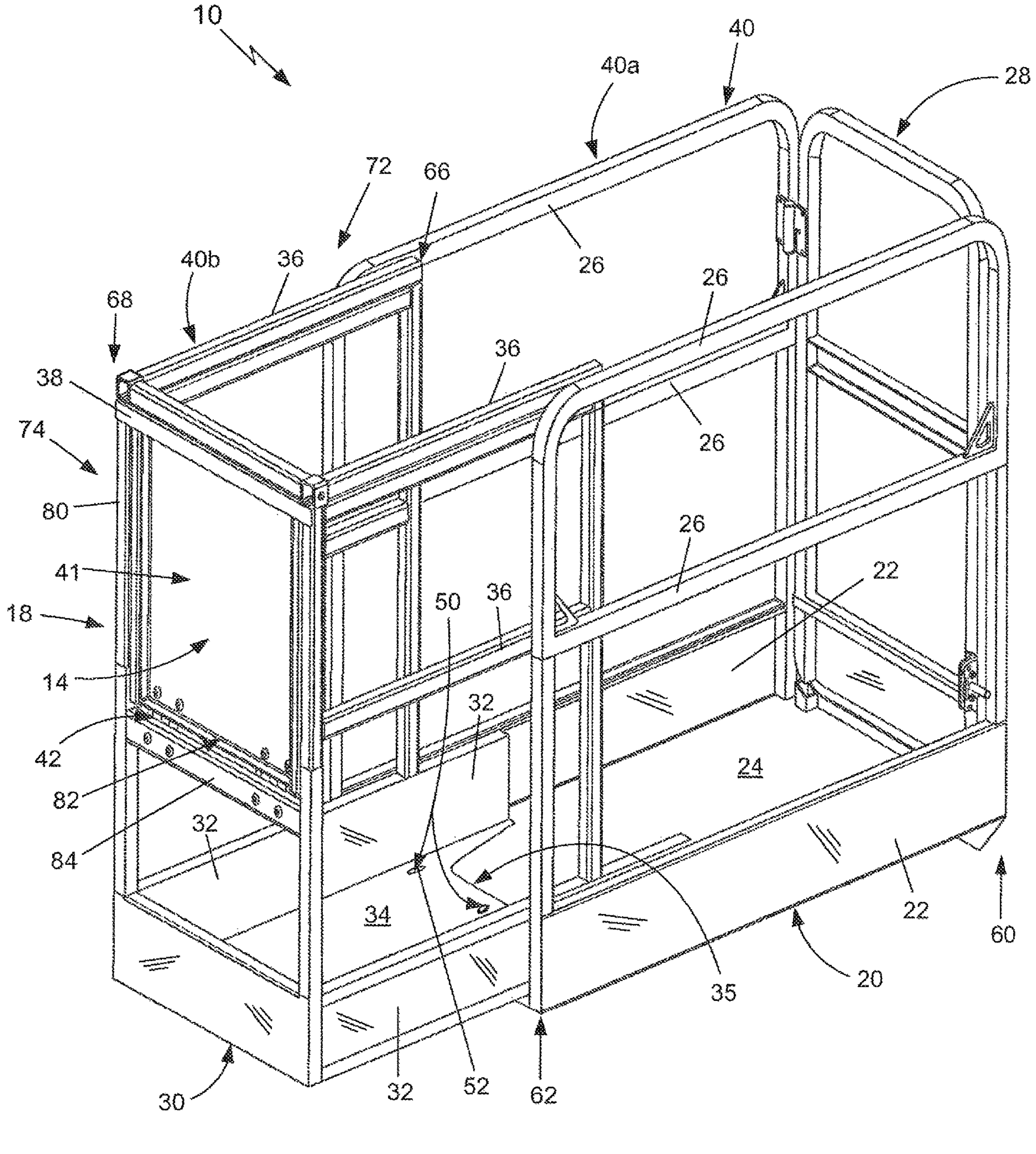
FIG. 2 is a front perspective view of the work platform of FIG. 1 showing the extension guardrail in a lowered position and the work step in a storage position.

With reference to the figures where like elements have been given like numerical designations to facilitate the reader's understanding of the present invention, the preferred embodiments of the present invention are set forth below. The enclosed figures are illustrative of several potential preferred embodiments and, therefore, are included to represent several different ways of configuring the present invention. Although specific components, materials, configurations and uses are illustrated, it should be understood that a number of variations to the components and to the configuration of those components described herein and shown in the accompanying figures can be made without changing the scope and function of the invention set forth herein. For instance, although the description and figures included herewith generally describe and show particular configurations for the new work platform, persons who are skilled in the related art will readily appreciate that the present invention is not so limited. In addition, the exemplary embodiments of the present device are shown and described herein with only those components which are required to disclose the present invention. Many of the necessary components for manufacturing, using, attaching to or otherwise benefitting from the present invention are not shown in the drawings or necessarily described below, but which are well known to persons who are skilled in the relevant art. As will be readily appreciated by such persons, the various elements of the present invention that are described below may take on any form consistent with forms which are readily realized by a person of ordinary skill in the art having knowledge of aerial work platforms, self-propelled chassis and scissor lift machines and the like that are utilized to beneficially position a work platform at a desired height with a person and materials thereon.

Figure 16:
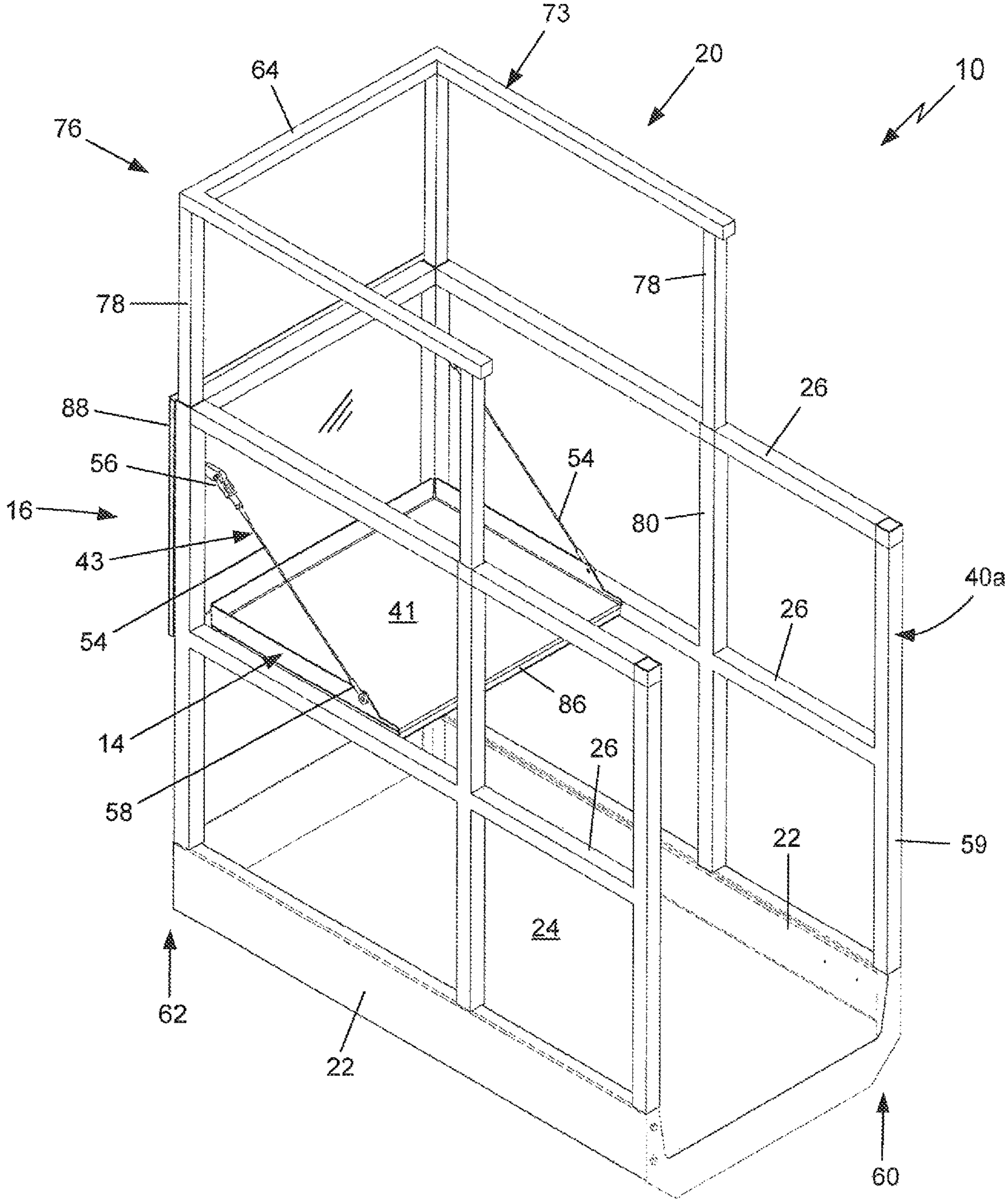
FIG. 16 is a back perspective view of the work platform of FIG. 15 showing the work step in its work position and the main guardrails in their raised position.
Figure 17:
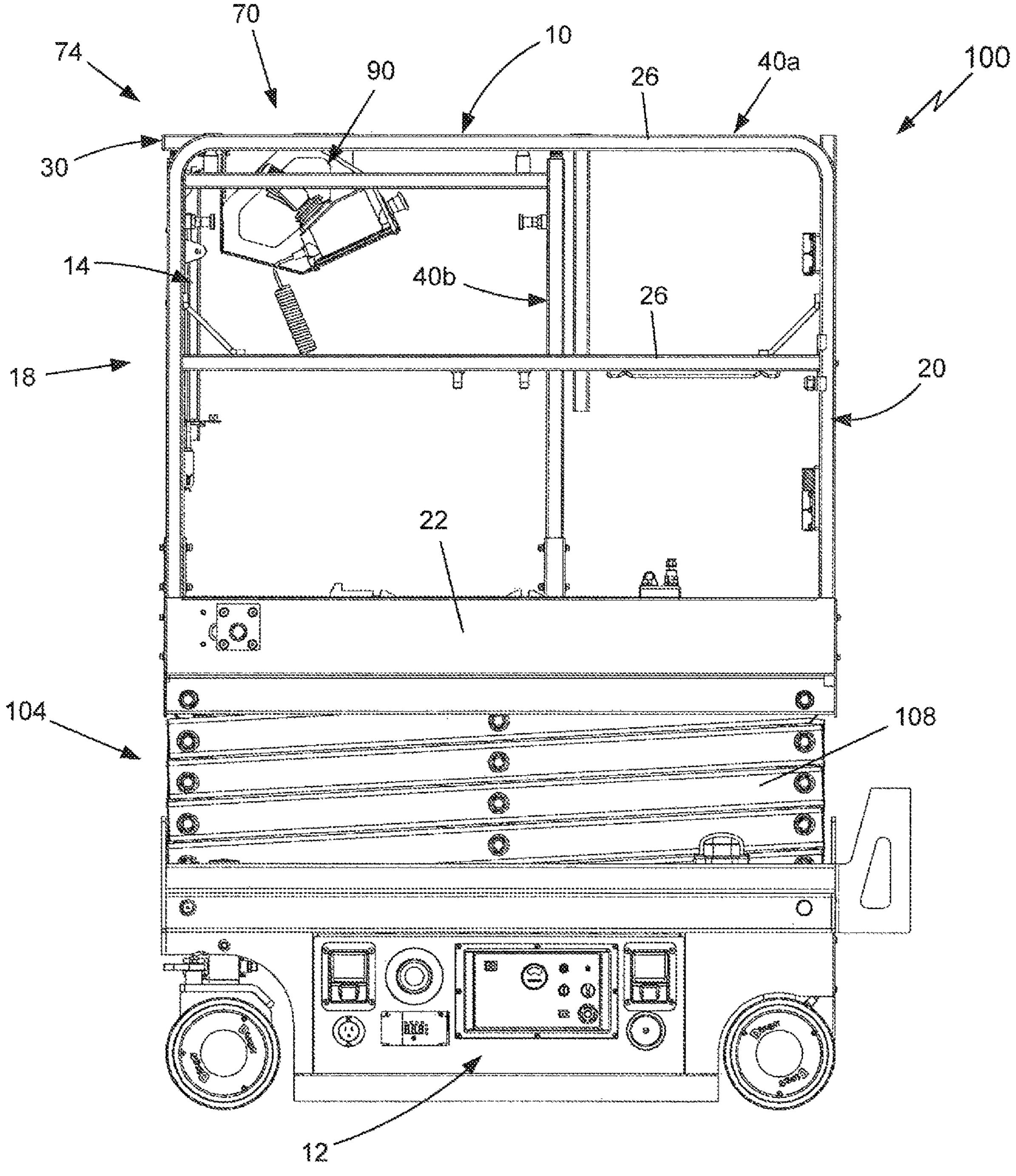
FIG. 17 is a side view of an aerial work platform for use with the work platform of the present invention, with the aerial work platform shown in its lowered position with the extension deck in its lowered and retracted positions.
Figure 18:
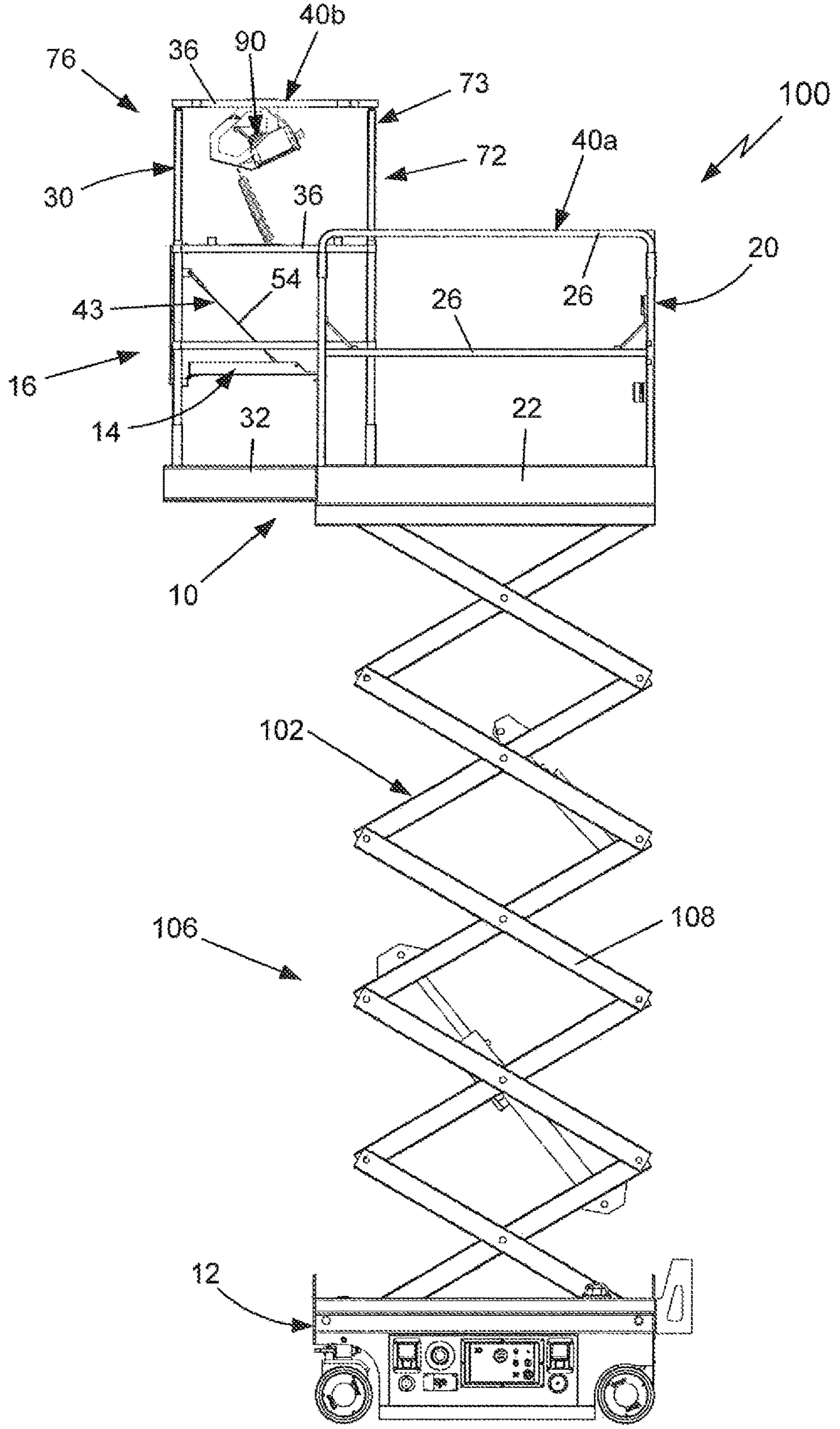
FIG. 18 is a side view of the aerial work platform of FIG. 17 shown in its raised position with the extension deck in its raised and extended positions.

A work platform that is configured pursuant to one or more preferred embodiments of the present invention is shown generally as 10 in FIGS. 1-2, 5-6, 9-12 and 14-18. As shown in these figures and set forth in more detail below, the work platform 10 of the present invention is beneficially structured and arranged to be moveably supported by a chassis 12, as shown in FIGS. 17-18, particularly a self-propelled chassis. The chassis 12 allows the user thereof to position the work platform 10 at a location in a manner which allows one or more persons to perform a work activity at the location while standing on and using materials on work platform 10. The present invention is directed to a new work platform 10 that provides the beneficial capabilities and functionality of prior art work platforms while also allowing the user to move a work step 14 to a work position 16, from a storage position 18, when he or she needs to reach a position that is higher than he or she would otherwise be able to reach in order to accomplish the work activity. More specifically, as set forth in detail below, the new work platform 10 of the present invention is structured and arranged to allow the operator to move the work step 14 from its vertically orientated storage position 18 to its horizontally orientated work position 16 when he or she needs to be elevated in order to be able to safely and effectively reach higher than he or she would otherwise be able to if not utilizing the work step 14 of the present invention.

Figure 15:
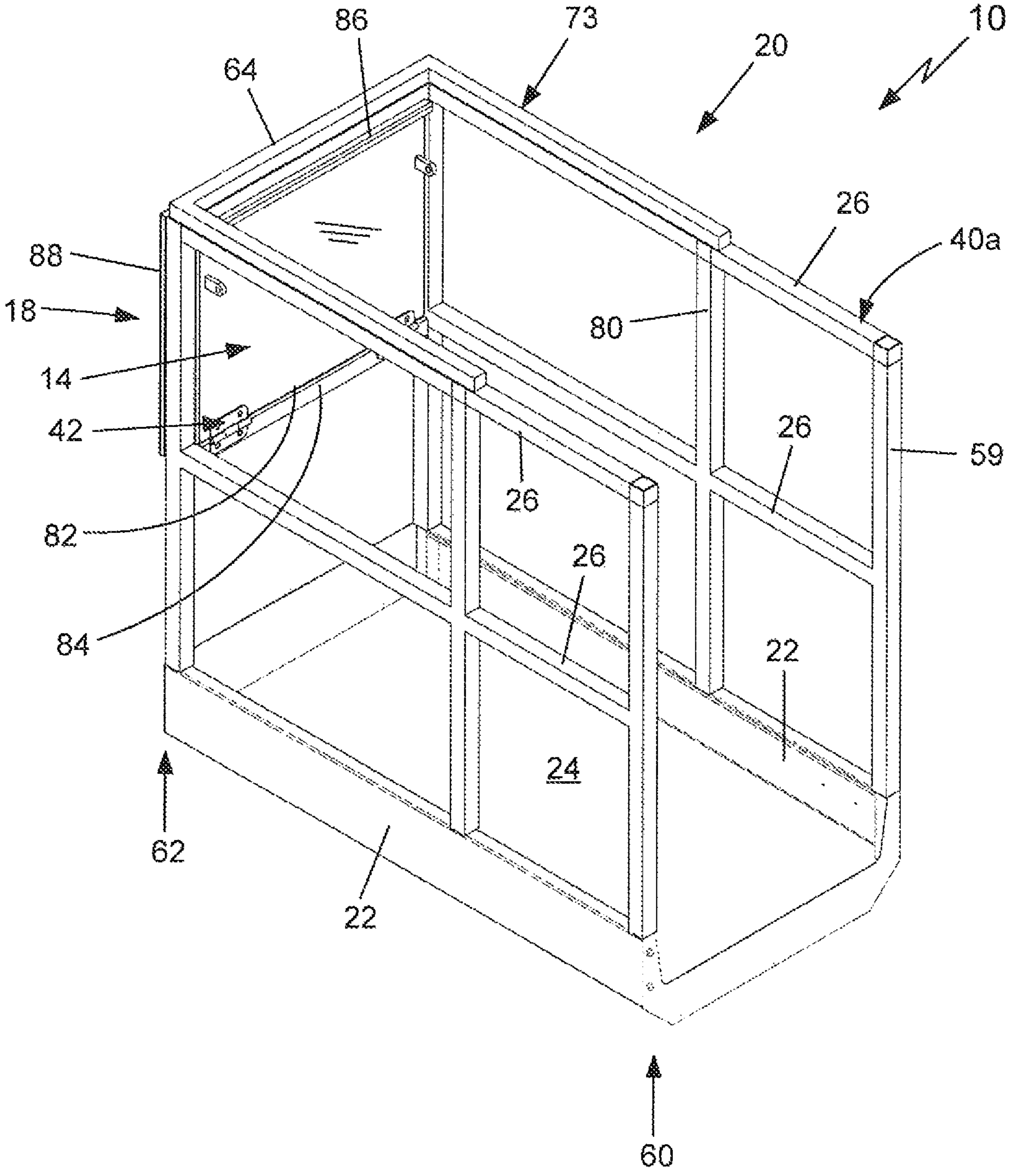
FIG. 15 is a back perspective view of a third embodiment of the work platform of the present invention showing the work step in its storage position and the main guardrails in their lowered position.

The work platform 10 has at least one deck with which the work step 14 associated therewith to achieve the higher reaching benefits of the present invention. In the embodiment shown in the figures, the work platform 10 of the present invention is of generally rectangular configuration and generally comprises a main deck 20 and an extension deck 30, one or more guardrail assemblies 40 and the work step 12, as shown in FIGS. 1-18. The work platform 10 is particularly useful for utilization with aerial work platforms, such as the scissors lift machine 100 shown in FIGS. 17-18. The main deck 20 of work platform 10 has a plurality of longitudinally extending structural members 22, a generally planar floor 24 attached to and supported by the structural members 22, a plurality of side guardrails 26 and an access gate 28 closing an opening at a first end 60 of the main deck 20. In the embodiment shown in FIGS. 1-14, wherein work platform 10 includes the extension deck 30, the second end 62 of the main deck 20 is open to allow a person to move between the main deck 20 and extension deck 30. In the embodiments of the work platform 10 that do not have an extension deck 30, as shown in FIGS. 15-16, the second end 62 of the main deck 20 is closed with a plurality of end guardrails 64. The side guardrails 26 and, as applicable, the end guardrails 64 define the guardrail assembly **40*a* of the main deck 20. In either embodiment, the guardrail assembly 40 extends generally upward from the respective floor 24 or 34 so as to at least partially (i.e., except for the openings necessary for ingress and egress from the main deck 20 or extension deck 30) be peripherally disposed along or relative to the floor 24 or 34**.

As shown in FIGS. 1-14, the extension deck 30 has a plurality of longitudinally extending structural members 32, a generally planar floor 34 attached to and supported by the structural members 32, a plurality of side guardrails 36 and a plurality of end guardrails 38. As will be readily appreciated by persons who are skilled in the art, the structural members 32 of the extension deck 30 are slidably received between and supported by the structural members 22 of the main deck 20 such that the floor 34 of the extension deck 30 is slightly above the floor 24 of the main deck 20. As shown in FIGS. 1-14, the first or proximal end 66 of extension deck 30 is open to allow a person to move between the main deck 20 and the extension deck 30. The end guardrails 38 close the second or distal end 68 of the extension deck 30. In the embodiments shown in the figures, the floor 34 has a cutout area 35 at the first/proximal end 66 of the extension deck 30 facing towards the access gate 28 at the first end 60 of the main deck 20 so that an operator can stand on the floor 24 of the main deck 20 while manually extending and retracting the extension deck 30 when desired. The extension deck 30 moves between a retracted position 70, shown in FIGS. 9-10, and an extended position 72, shown in FIGS. 1-2, 5-6, 11-12 and 14. In its retracted position 70, the extension deck 30 is positioned at least substantially within the confines of the main deck 20 with the second/distal end 68 of the extension deck 30 at or generally near the second end 62 of the main deck 20. In its extended position 72, the first/proximal end 66 of the extension deck 30 is at or generally near the second end 62 of the main deck 20 and the second/distal end 68 of the extension deck 30 is located in spaced apart relation to the second end 62 of main deck 20. To facilitate movement between the retracted position 70 and the extended position 72, the side guardrails 36 and end guardrails 38 of the extension deck 30 are sized and connected such that the extension deck 30 and its floor 34 moves above the floor 24 of the main deck 20. Stops (not shown) are provided as is conventional to define the safe limits of travel of the extension deck 30. The configuration and use of work platforms 10 having extension decks 30 that are slidably or otherwise movably engaged with the main deck 20 are generally well known to persons skilled in the related art.

The side guardrails 36 and the end guardrails 64 define the guardrail assembly 40*b* of the extension deck 20. As will be readily appreciated by persons who are skilled in the art, for work platforms 10 having an extension deck 30, the end guardrails 38 at the second/distal end 68 thereof close the second end 62 of the main deck 20, as shown in FIGS. 1-2, 5-6, 9-12 and 14. As is common for prior art extension guardrail assemblies 40*b*, the guardrail assembly 40*b* is structured and arranged to move an upper section 73 thereof between a lowered position 74, as shown in FIGS. 2, 4-5, 7, 9, 12 and 14, and a raised position 76, shown in FIGS. 1, 3, 6, 8, 10-11 and 13. In the embodiments shown in the figures, the upper section 73 of the guardrail assembly 40*b* of the extension deck 30 may be moved from its lowered position 74, as exemplified in FIG. 2, to its raised position 76, as exemplified in FIG. 1, by telescopically sliding the plurality of upper guardrail support legs 78 into or alongside the cooperatively configured plurality of lower guardrail support legs 80 immediately below the upper guardrail support legs 78 of the guardrail assembly 40*b*. One or more leg engaging members 39, as shown in FIGS. 5-10 and 13-15, are provided to lock the upper guardrail support legs 78 relative to the lower guardrail support legs 80 to secure the upper section 73 of the guardrail assembly 40*b* in its raised position 76. Likewise, in the embodiments of the present invention shown in FIGS. 15-16 wherein the work platform 10 does not have an extension deck 30, the guardrail assembly 40*a* also has an upper section 73 that moves between a lowered position 74 (FIG. 15) and a raised position 76 (FIG. 16) by utilizing the above-described telescopically configured upper guardrail support legs 78 and lower guardrail support legs 80. In either embodiment, when the work step 14 is moved to its work position 16 for use by a person in, as applicable, the main deck 20 or extension deck 30, the upper section 73 of the respective guardrail assembly 40*a* or 40*b* should be moved to the raised position 76 so the person can safely stand on the work step 14 to accomplish a work activity that requires the person to be elevated above the floor 24 of the main deck 20 or the floor 34 of the extension deck 30, as shown in FIGS. 1, 3, 6, 8, 10-11, 13 and 16. When the upper section 73 of the guardrail assembly 40*a* or 40*b* of, respectfully, the main deck 20 or extension deck 30 is in its lowered positions 74, the work step 14 will be in its storage position 18, as shown in FIGS. 2, 4, 7, 9, 12 and 14-15. Typically, when the work step 14 is in its storage position 18, the work step 14 will be vertically disposed relative to the floor 34 of the extension deck 30 or the floor 24 of the main deck 20 so as to allow the worker using work platform 10 to move about substantially the entire floor 34 or floor 24 without significant inference from the work step 14 in its storage position 18, as shown in FIGS. 2, 5, 9, 12, 14-15.

As set forth above, the work platform 10 of the present invention has a movable work step 14 that is structured and arranged to allow a person who is working in the main deck 20 or the extension deck 30 to reach an area higher than he or she could reach if the person was merely standing on the floor 24 of the main deck 20 or the floor 34 of the extension deck 30. In one embodiment, the work step 14 is configured with a rectangular (preferred), square or other shape with lengthwise extending side edges for structural rigidity at the sides of the work step 14 and a width that extends substantially the full width of, as applicable, the main deck 20 or extension deck 30 to provide an elevated step up work platform with an upwardly disposed deck surface 41 when needed to safely reach a higher location than he or she could otherwise reach. In the embodiments where work platform 10 has extension deck 30, one or more hinges or other pivoting members 42 pivotally interconnect the first or proximal end 82 of the work step 14 to a cross brace or other deck attachment member 84, which (as shown in the figures) may be one of the end guardrails 38, at or near the second/distal end 68 of the extension deck 30 so the work step 14 can move between its storage position 18 and work position 16 for use thereof (i.e., stepping up onto the upwardly disposed deck surface 41), as shown in FIGS. 1-16. In the extension deck configuration, the second or distal end 86 of the work step 14 will extend horizontally inward from the second/distal end 68 of the extension deck 30 toward first end 60 of the main deck 20 when the work step 14 is in its work position 16, as shown in FIGS. 1, 3, 6, 8, 10-11, 13 and 16, and extend vertically upward away from the floor 34 of the extension deck 30 when the work step 14 is in its storage position 18, as shown in FIGS. 2, 4-5, 7, 9, 12 and 14-15. In the embodiments where the work platform 10 does not have extension deck 30, one or more hinges or other pivoting members 42 pivotally interconnect the first/proximal end 82 of the work step 14 to a cross brace or other deck attachment member 84, which (as shown in the figures) may be one of the end guardrails 64, at or near the second end 62 of the main deck 20 so the work step 14 can move between its storage position 18 and work position 16 for use thereof (i.e., stepping onto the upwardly disposed deck surface 41). In the configuration of the work platform 10 without extension deck 30, the second/distal end 86 of the work step 14 will extend horizontally inward from the second end 62 of the main deck 20 toward the first end 60 of the main deck 20 when the work step 14 is in its work position 16, as shown in FIG. 16, and extend vertically upward away from the floor 24 of the main deck 20 when the work step 14 is in its storage position 18, as shown in FIG. 15. In some embodiments, when the work step 14 is in its storage position 18 the second/distal end 86 of the work step 14 will be directed downward instead of upward.

In the embodiments shown in the figures, the pivoting members 42 are a pair of hinges, as best shown in FIGS. 3-4, 7 and 14-15. In use, the person using the work platform 10, will lift the unhinged second/distal end 86 of the work step 14 from its horizontally extending work position 16 in spaced apart relation above the floor 34 of the extension deck 30 or the floor 24 of the main deck 20 to a vertically extending storage position 18 at or near, respectively, either the second/distal end 68 of the extension deck 30 or the second end 62 of the main deck 20 when the work step 14 is not in use. In one embodiment, the pivoting members 42 of work platform 10 will be structured and arranged to be sufficiently strong enough on their own to support the work step in its horizontally disposed work position 16, which will require the pivoting members 42 to support the weight of a person and his or her equipment while standing on the deck surface 41 of the work step 14. As will be readily appreciated by persons skilled in the art, however, it may be difficult and/or expensive to utilize hinges or other pivoting members 42 that are strong enough to be able to provide the necessary support. As a result, in the preferred embodiments of the work platform 10 of the present invention, the work step 14 will be held in its horizontally disposed work position 16 by a step support mechanism 43 that are structured and arranged to hold the work step 14 in its work position 16.

In the embodiment of the work platform 10 of the present invention shown in FIGS. 1-10, the step support mechanism 43 comprises one or more support legs 44 that have a first or proximal end 46 that are pivotally connected to the work step 14 such that the support legs 44 will pivot the second or distal ends 48 of the support legs 44 downward toward the floor 24 of the main deck 20 or the floor 34 of the extension deck 30 when the work step 14 is in its work position 16, as best shown in FIGS. 1, 3, 6, 8 and 10, and then pivot back up against the lower surface of the work step 14 when the work step 14 is in its storage position 18, as best shown in FIGS. 2, 4-5, 7 and 9. In a preferred configuration, the floor 24 or 34 of the work platform 10 has a leg engaging mechanism 50 associated therewith that engages the second/distal end 48 of the support legs 44 when the work step 14 is in its work position 16. In one embodiment, the second/distal end 48 of the support legs 44 are specially configured to engage the floor 24/34 to help hold the support legs 44 in their downward position when the work step is in its work position 16. In such a configuration, the support legs 44 can have short projections at the ends thereof that are sized and configured to be received in leg engaging apertures 52, such as holes, retainers or other positioning pockets, in the floor 24 of the main deck 20 or the floor 34 of the extension deck 30 when the work step 14 is in its horizontally disposed work position 16.

Figure 7:
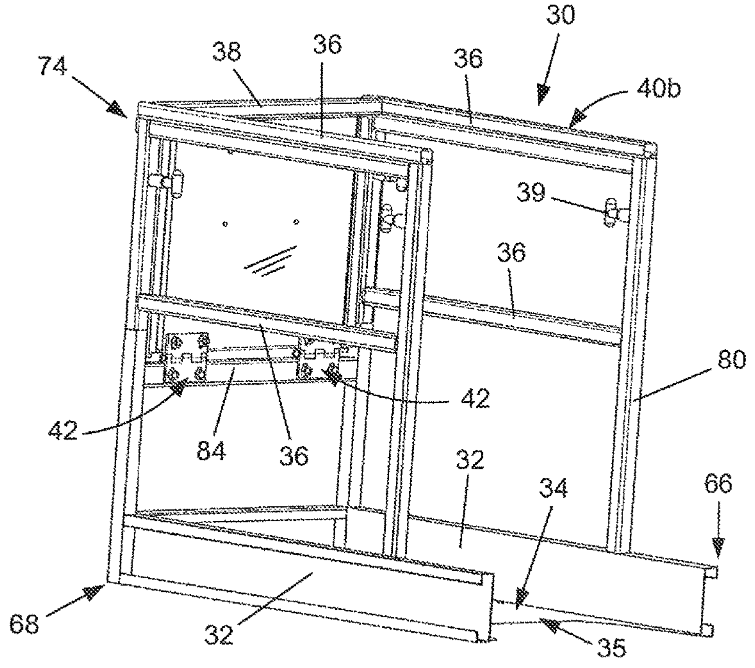
FIG. 7 is an isolated side perspective view of the extension deck of FIG. 5 shown without the operator control station, particularly showing the hinged connection of the work step.
Figure 8:
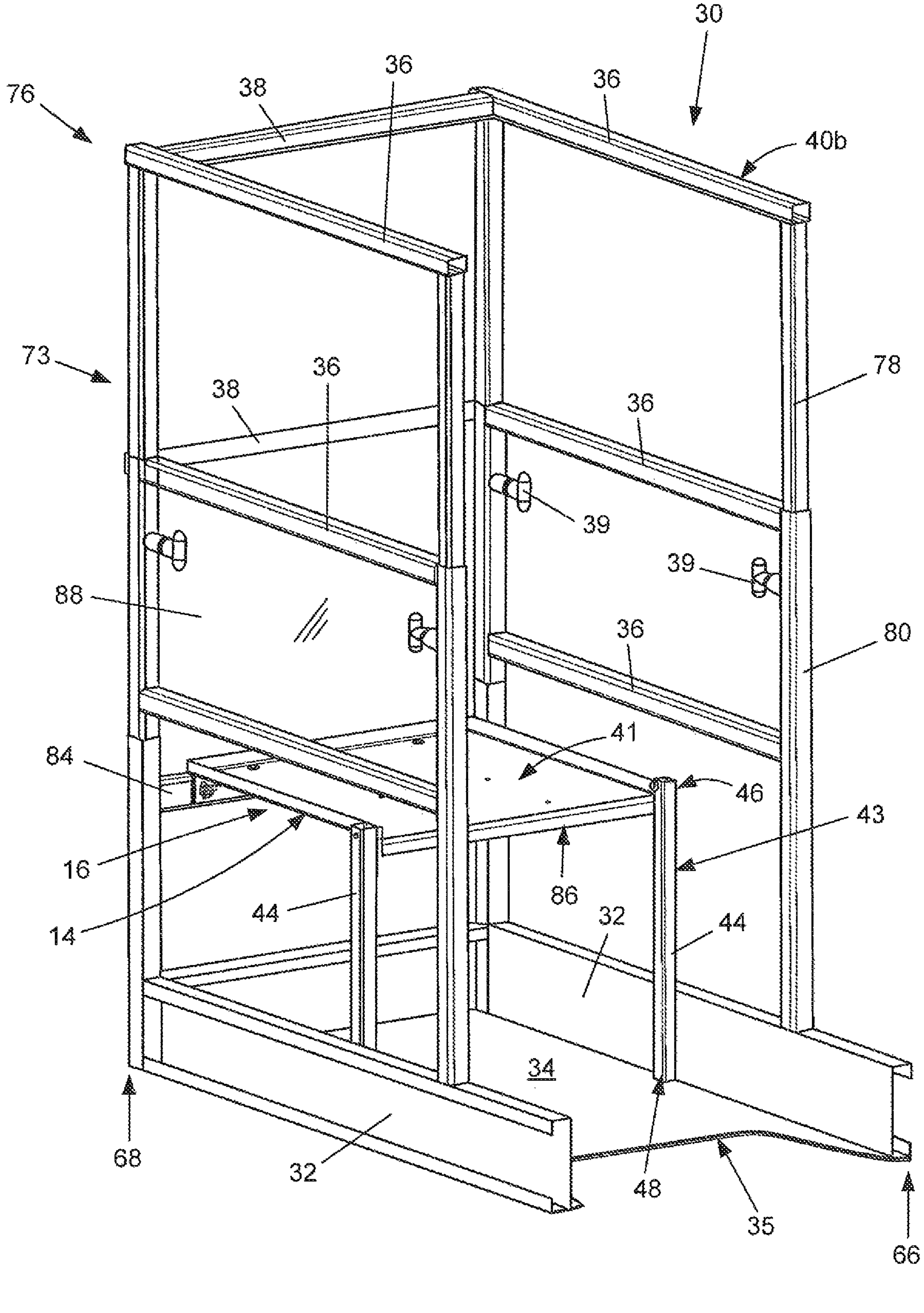
FIG. 8 is a back perspective view of the extension deck of FIG. 3 showing the telescopic configuration of the extension guardrails.
Figure 9:
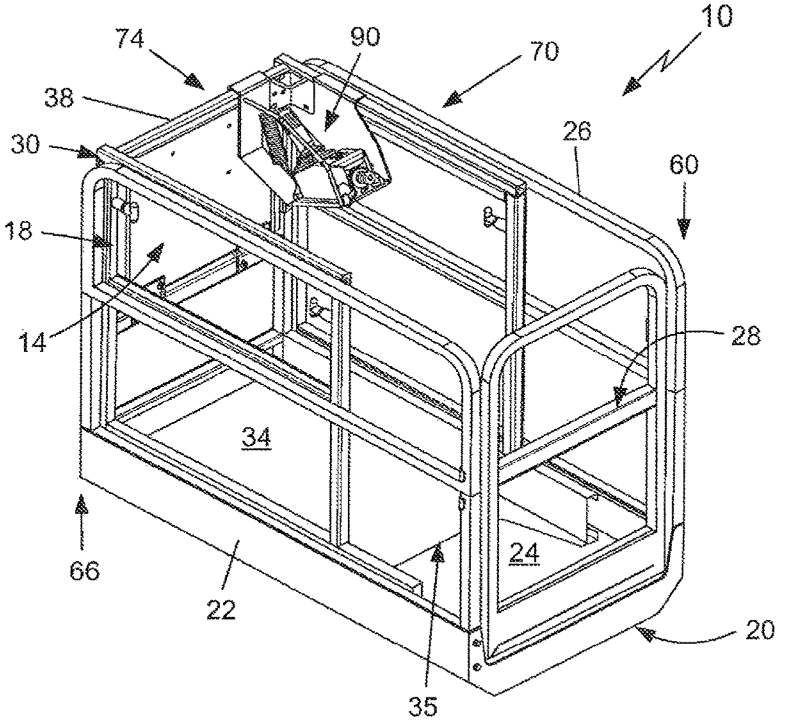
FIG. 9 is a top perspective view of the work platform of FIG. 1 showing the extension deck in its retracted position, the extension guardrails in their lowered position and an operator control station on the extension guardrail.
Figure 10:
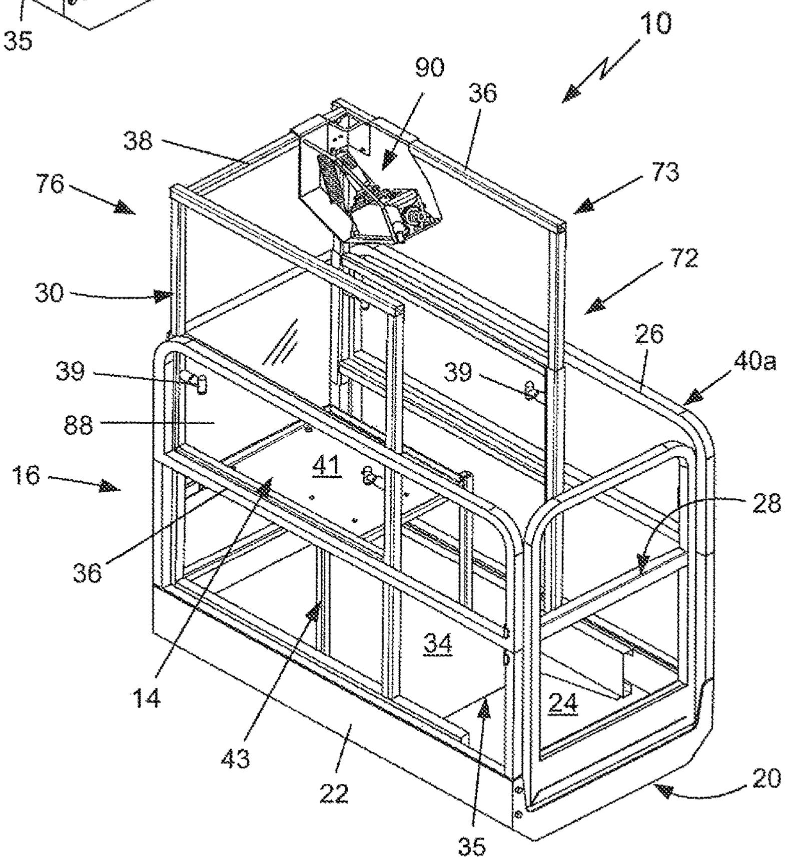
FIG. 10 is a top perspective view of the work platform of FIG. 9 showing the extension guardrails in their raised position.

As seen in FIGS. 7 and 8, the work step 14 is connected along a pivot axis to a cross brace or other supporting structure (i.e., the deck attachment member 84) on the main deck 20 or extension deck 30, such as, respectively, an end guardrail 64 of the main deck 20 or an end guardrail 38 of the extension deck 30. As set forth above, the deck attachment member 84 can be a hinge, with a pair of such hinges shown in use, and the step support legs 44 are preferably pivotally connected to the work step 14 to be located closely alongside the step surface 41 when the work step 14 is pivotally raised to its storage position 18. The work step 14 and support legs 44 may be secured to a guardrail 26 or 36 by temporary fastening means such as snap retainers or the like, with the work step 14 being in its storage position 18 between the vertically extending corner guardrail legs. Alternatively, as set forth above, it may be preferred to swing the work step 14 to a storage position 18 with the second/distal end 86 of the work step 14 below the hinges or other pivoting members 42 so as to be downwardly extending instead of being upwardly extending. In other embodiments, the support legs 44 can be configured to pivot outward from the work deck 14 to engage a pair of opposing side guardrails 26 or 36 of, respectively, the main deck 20 or the extension deck 30 or the support legs 44 can be pivotally attached to as set of opposing pair of side guardrails 26/36 so as to swing inward over the floor 24 or 34 to be under the work deck 14 to support the work deck in its horizontal work position 16 or the support legs 44 can be associated with the floor 24 or 34 so as to be raised upward and engage the lower side of the work deck 14 to support the work deck 14 in its horizontal work position 16. Other configurations may be possible.

Figure 11:
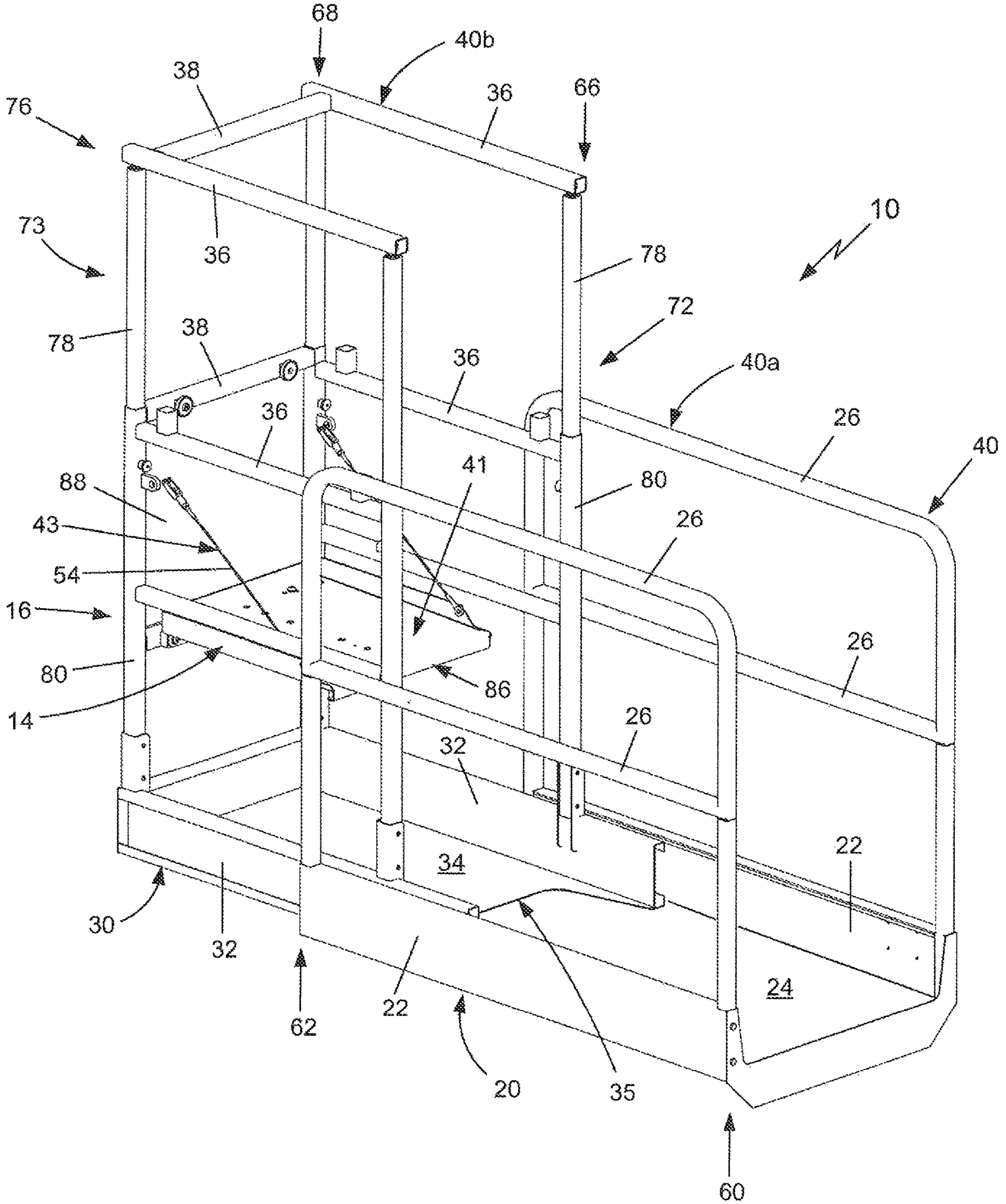
FIG. 11 is a side perspective view of a work platform that is configured according to a second embodiment of the present invention, with the work platform having a main deck, an extension deck in an extended position, an extension guardrail in a raised position and a work step supported in a work position by a pair of cables.
Figure 12:
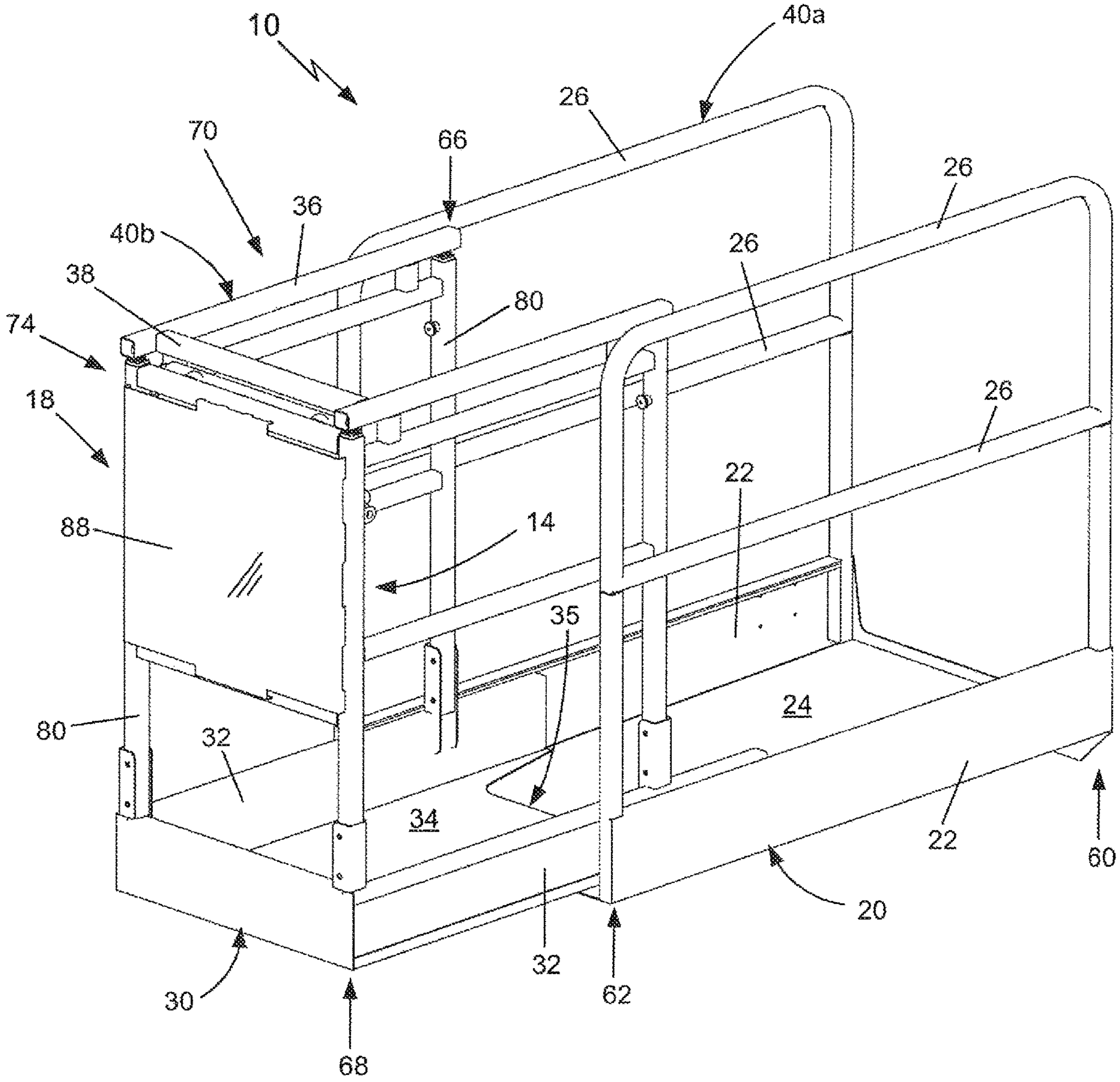
FIG. 12 is a front perspective view of the work platform of FIG. 11 showing the extension guardrail in a lowered position the work step in a storage position.
Figure 13:
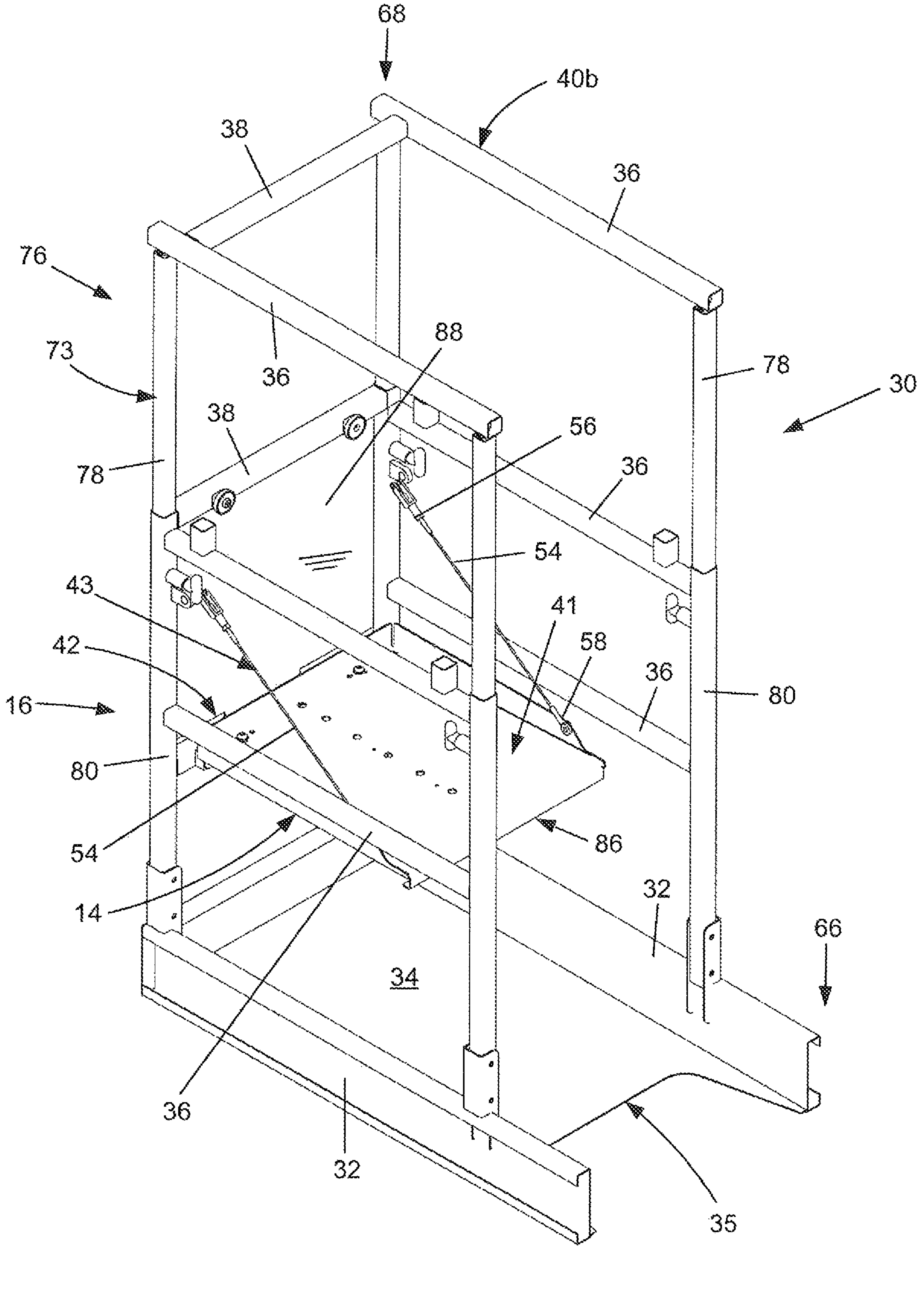
FIG. 13 is an isolated side perspective view of the extension deck of the work platform of FIG. 11 to better illustrate the cables supporting the work step.
Figure 14:
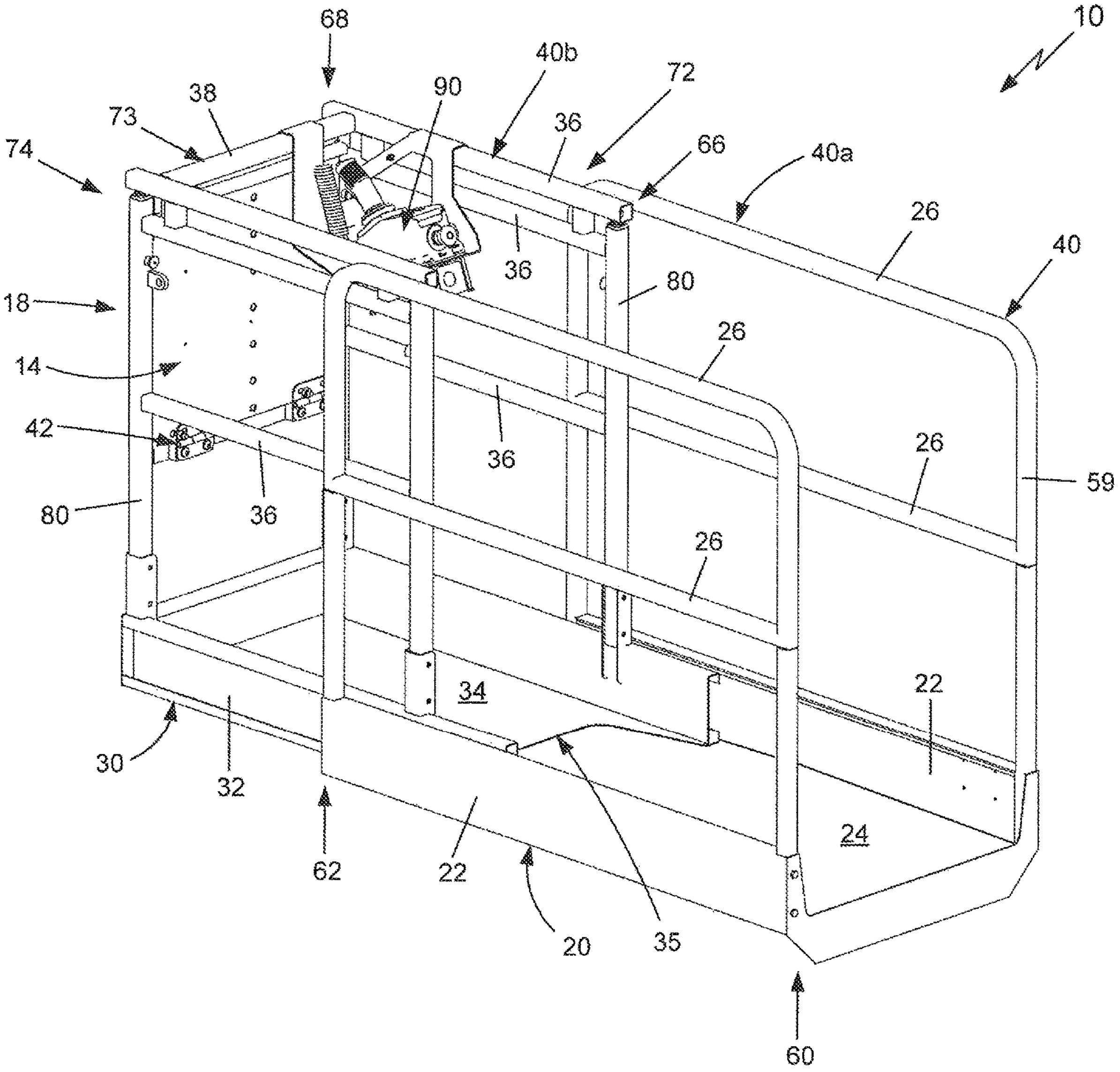
FIG. 14 is a back perspective view of the work platform of FIG. 12 showing an operator control station on the extension guardrail.

In the embodiments of the work platform 10 of the present invention shown in FIGS. 11-16, the step support mechanism 43 comprises one or more flexible cables 54, such as wire rope or the like, that each have a first/proximal end 56 affixed to a support structure and a second or distal end 58 attached to the work step 14. In one embodiment, the support structure is one of the vertical guardrail members 59 of the guardrail assembly 40 of the main deck 20 or extension deck 30, as best shown in FIGS. 11-16, or to a cross member or other deck attachment member 84, such as one of the end guardrails 64 or 38 of, respectively, the main deck 20 or the extension deck 30. In the embodiments shown in FIGS. 11-16, the first/proximal ends 56 of the flexible cables 54 are attached to vertical guardrail member 59 above the hinge or hinges 42. The second/distal ends 58 of the cables 54 are affixed to the work step 14 at locations remote from the hinge or hinges 42 such that the cables 54 will safely support the work step 14 and weight thereon when the work step 14 is in its horizontally disposed work position 16. As shown in FIGS. 11, 13 and 16, turnbuckles or other devices may be provided to adjust the length of each cable 54 to assure horizontal positioning of the work step 14. In a preferred embodiment, work step 14 is folded upwardly to a substantially vertical storage position 18 when the work step 14 is not in use and then secured in place by push pins, ties or the like to guardrail assembly 40 at the second end 62 of the main deck 20 or at the second/distal end 66 of the extension deck 30. The cables 54 are selected to flex for storage between the guardrail members of the guardrail assembly 40 on the main deck 20 or extension deck 30 and the work step 14 itself as the work step 14 is pivoted with the hinge or hinges 42 (or other types of pivoting devices) from the horizontal work position 16 to a vertically extending orientation for storage in the storage position 18. As will be readily appreciated by persons who are skilled in the relevant art, cables 54 can be made out of a wide variety of materials, including metal, plastics, composites or the like that are sufficiently strong enough to support the anticipated weight (e.g., personnel and materials) which are likely to be on the work step 14 during use of the work platform 10 to accomplish a desired work objective.

If desired, any applicable safety and operating instructions can be displayed on the floor 24 or 34 such that the instructions are visible when the work step 14 is in its horizontally extended work position 16 and/or on the underside of the work step 14 to be visible when the work step 14 is in its vertically disposed storage position 18. Alternatively, these instructions can be placed on a decal panel 88, shown in FIGS. 11-13 and 15-16.

Figure 3:
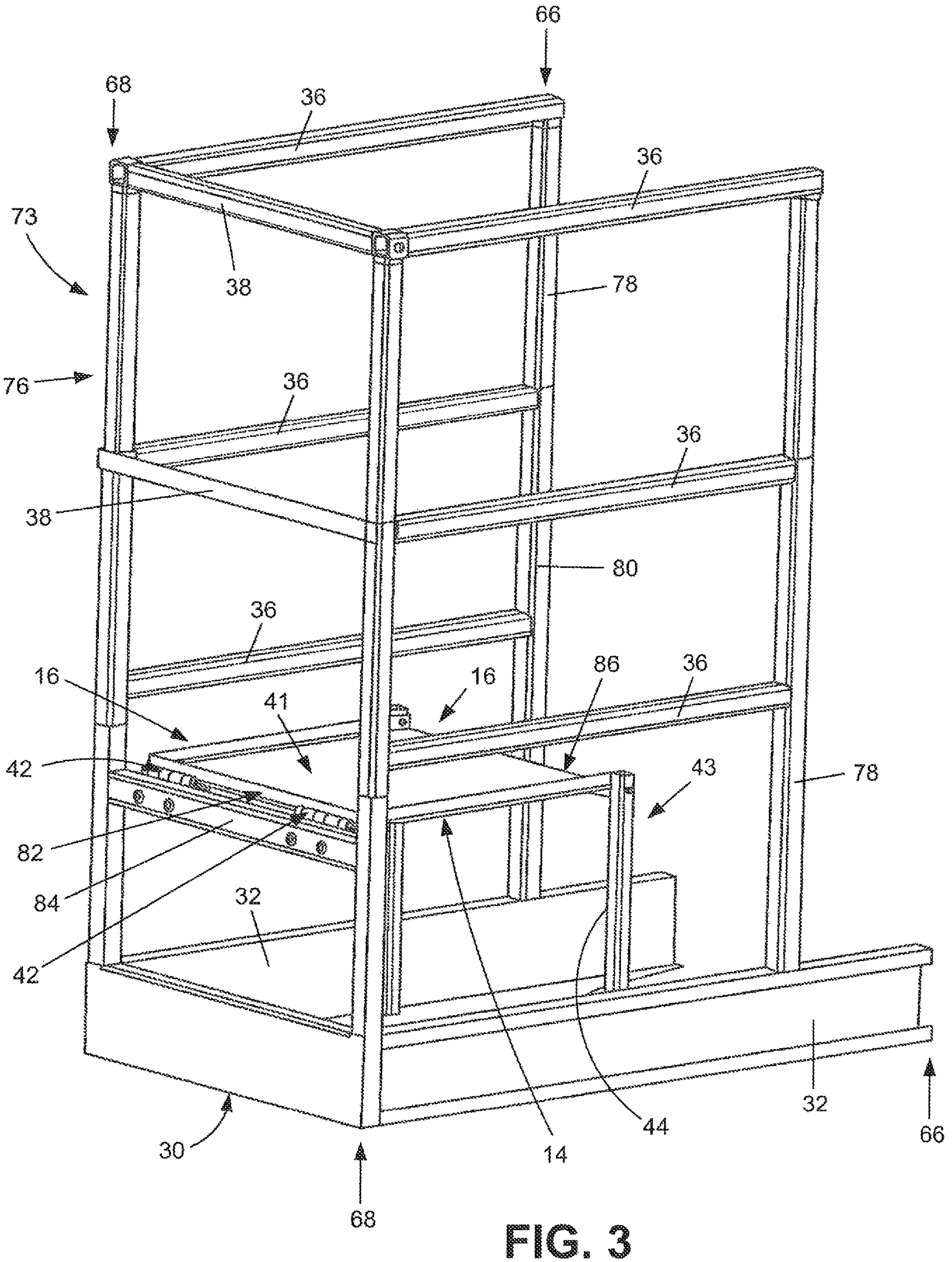
FIG. 3 is a front perspective view of the extension deck of FIG. 1 particularly showing the work step in its work position.
Figure 4:
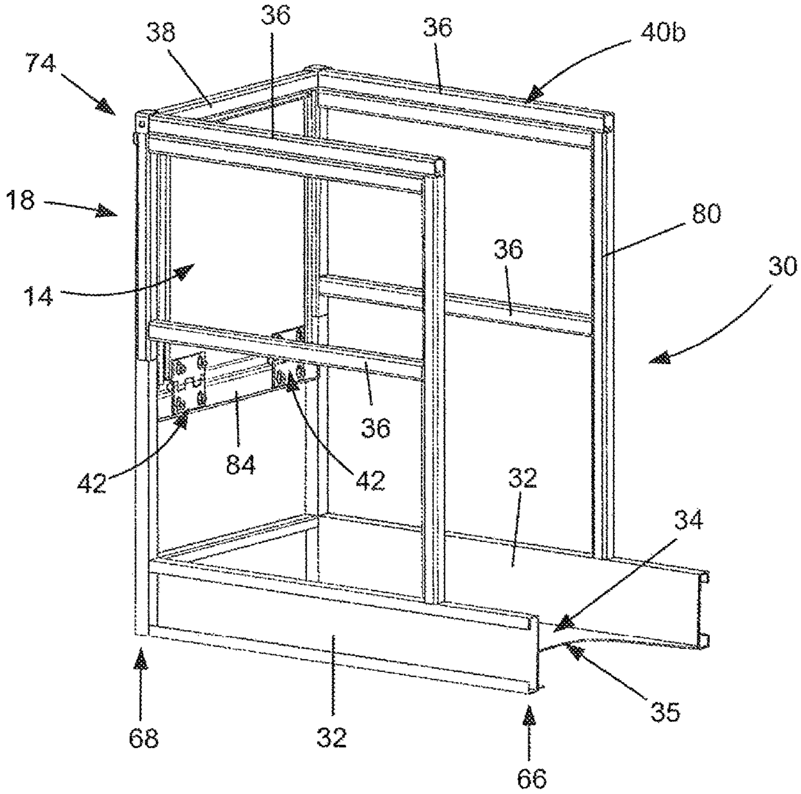
FIG. 4 is a side perspective view of the extension deck of FIG. 3 showing the extension guardrails in their lowered position and the work step in its storage position.
Figure 5:
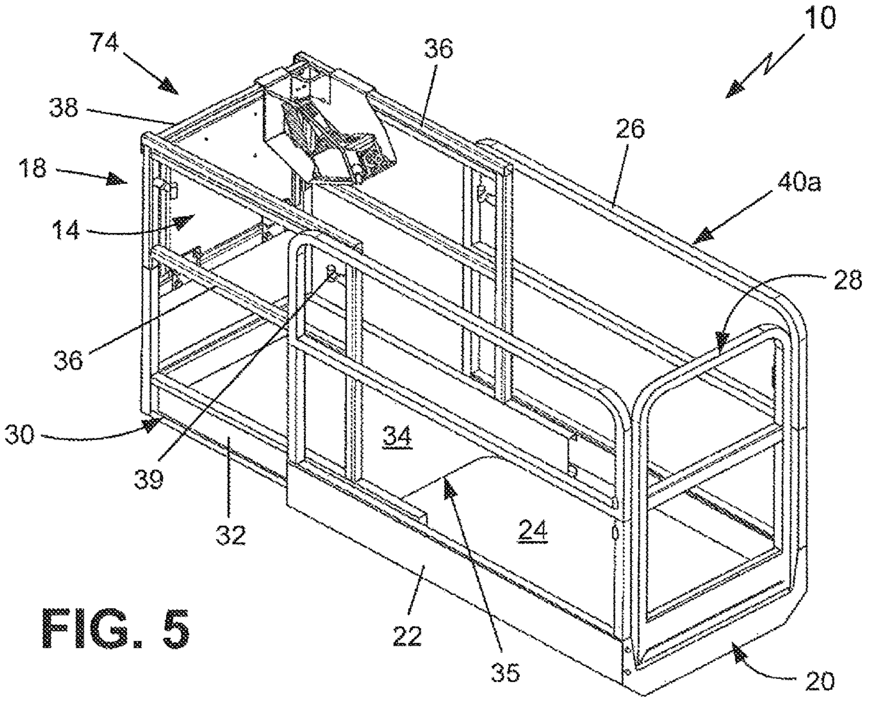
FIG. 5 is a top perspective view of the work platform of FIG. 1 showing the extension deck in its extended position, the extension guardrails in their lowered position, the work step in its storage position and an operator control station on the extension guardrail.
Figure 6:
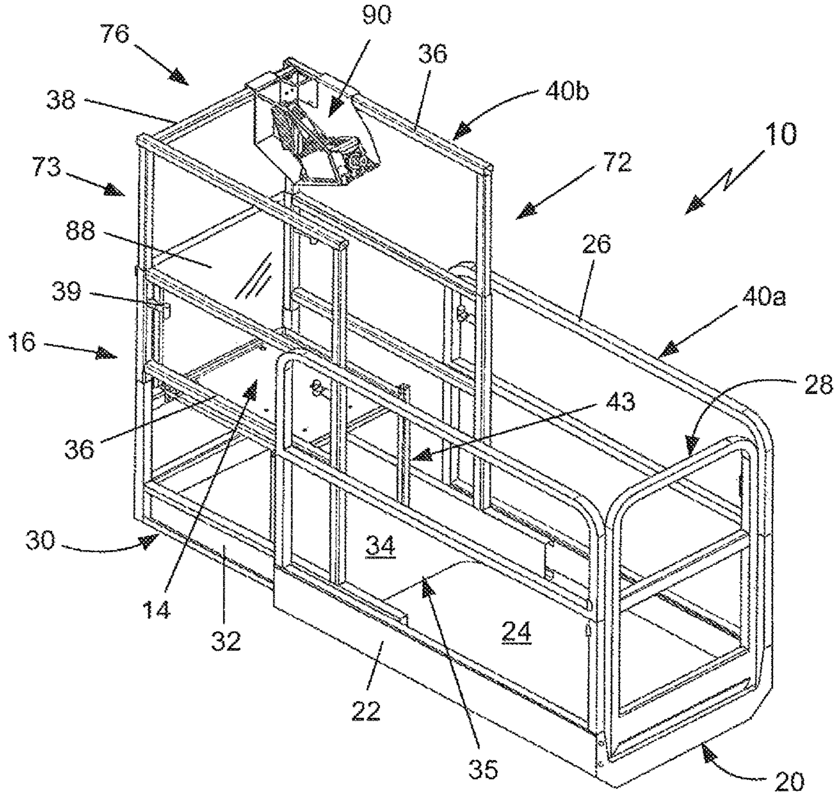
FIG. 6 is a top perspective view of the work platform of FIG. 5 showing the extension guardrails in their raised position and the work step in its work position.

As is conventional, the main deck 20 and the extension deck 30 each have regulation height guardrails 40. An adjustable height guardrail upper section 73 (or multiple sections) on the main deck 20 or extension deck 30 provides worker protection via the raisable upper section or sections 73 of the guardrail assembly 40 to protect a worker when he or she is standing on the work step 14. The upper section 40 may be manually lifted from its lowered position 74 in which the upper vertical legs 78 thereof are preferably telescopically stored inside or alongside the lower vertical legs 80 of the main deck 20 or extension deck 30 guardrail sections 40. The upper sections 73 of the guardrail sections 40 may be retained in either the stored or lowered position 74 or in the work or raised position 76 by magnets, T-handle pull pins or other leg engaging members 39 (as shown in FIGS. 3 and 4) which engage with holes in the vertically extending guardrail legs 78/80. If desired, a powered mechanism may be provided to assist with raising the upper section 73 to its operable or raised position 76. In the raised position 76, as shown in FIGS. 1, 3, 6, 8, 10-11, 13 and 16, the upper section 73 provides an elevated safe work height position for the guardrails 40 to protect a worker when he or she stands on work step 14 during use of the work platform 10. Typically, an operator control station 50 is provided in any suitable location on the main deck 20 or the extension deck 30, shown in FIGS. 5-6, 10 and 14, to allow the person on the work platform 10 to control the upward and downward movement of the work platform 10, the extending and retracting of the extension deck 30, the raising and lowering of the upper section 73 and/or other functions of the work platform 10. In some embodiments, it may be beneficial to link the movement of the work step 14 to the movement of the upper section 73 to ensure the work platform is safely utilized by a worker needing the extra elevation. Specifically, it may be beneficial to link these components such that the worker cannot move the work step 14 from its storage position 18 to its work position 16 unless the upper section 73 has been previously moved from its lowered position 74 to its raised position 76 so the worker can safely step up onto the upwardly disposed step surface 41 of the work step 14 when he or she needs to reach higher than he or she would be able to reach while standing on the floor 24 or floor 34. The work step 14 and the upper section 73 can be linked in any of widely known and available manners, including but not limited to a mechanical linkage, with appropriate mechanical devices, or an electronic link, with appropriate sensors, processors and the like, such that a person could not lower the work step 14 unless he or she previously raised the upper section 73. These and other mechanisms and devices for linking the work step 14 and upper section 73 in the manner described above are well known to persons who are skilled in the relevant art.

FIGS. 17 and 18 show use of the new work platform 10 with an aerial work platform 100 having a chassis 12 that is configured to move the work platform 100 on a surface, such as a floor or the like, and a lift mechanism 102 that is structured and arranged to move the work platform 10 between a lowered position 104 (FIG. 17) and a raised position 106 (FIG. 18). In a preferred embodiment, the chassis 12 is a self-propelled chassis that is controlled by an operator who utilizes the operator control station 90 while he or she is standing on the main deck 20 or extension deck 30. In the embodiment shown in FIGS. 17-18, the lift mechanism 102 is a scissor lift apparatus 108. The configuration and use of aerial work platforms 100 having a chassis 12, whether self-propelled or not, and a lift mechanism 102, whether it is of the scissor lift apparatus 108 type or another type of lift mechanism 102, with a work platform 10 are well known to persons who are skilled in the relevant art.

As will be readily appreciated by persons skilled in the art, the above described embodiment provides a significant improvement to more easily allow workers to minimize re-positioning of the aerial work platform and step up to better reach into and above small access openings such as those in drop ceilings to work on utilities suspended from structural ceilings.

While there are shown and described herein specific forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape and use. For instance, there may be numerous components of the embodiments described herein that can be readily replaced with equivalent functioning components to accomplish the objectives and obtain the desired aspects of the present invention. The various embodiments set forth herein are intended to explain the best mode of making and using the present invention as currently known to and appreciated by the present inventor(s) and to enable other persons who are skilled in the relevant art to make and utilize the present invention. Although, the described embodiments may comprise different features, not all of these features are required in all embodiments of the present invention. More specifically, as will be readily appreciated by persons who are skilled in the art, certain embodiments of the present invention only utilize some of the features and/or combinations of features disclosed herein.

What is claimed is:

1. A work platform for use with an aerial work platform, said work platform comprising:

a deck having a floor and a guardrail assembly, said guardrail assembly extending upward from said floor, said guardrail assembly being at least partially peripherally disposed relative to said floor, said guard rail assembly including an upper section having three sides that are movable between a lowered position and a raised position;

a work step operatively associated with said guardrail assembly, said work step being movable between a storage position wherein said work step generally does not interfere with movement on said floor and a work position in which said work step is horizontally oriented above said floor so as to upwardly dispose a step surface of said work step for use thereof;

one or more pivoting devices connecting said work step to a deck attachment member associated with said guardrail assembly, said one or more pivoting device selected to pivot said work step between said storage position and said work position relative to said guardrail assembly;

a step support mechanism associated with at least one of said guardrail assembly, said floor and said work step, said step support mechanism structured and arranged to support said work step in said work position, wherein the upper section of said guardrail assembly in the raised position provides safety to a worker standing at an elevated position on the work step in the work position; and an operator control station located entirely within said guardrail assembly, and when said guardrail is in said lowered position, the operator control station mechanically prevents the work step from pivoting to said working position.

2. The work platform of claim 1, wherein said one or more pivoting devices is at least one hinge.

3. The work platform of claim 1, wherein said step support mechanism comprises one or more flexible cables interconnecting said guardrail assembly and said work step.

4. The work platform of claim 1, wherein said deck is an extension deck that is movably supported by a main deck so as to move between a retracted position substantially enclosed by said main deck and an extended position extending outward from said main deck, each of said main deck and said extension deck being cooperatively configured to allow movement between said main deck and said extension deck.

5. The work platform of claim 1, wherein said work step and said upper section are cooperatively linked such that said work step cannot be moved from said storage position to said work position unless said upper section has previously been moved from said lowered position to said raised position to allow safe use of said work step.

6. The work platform of claim 1, wherein said work step is pivotally connected to said deck attachment member at two pivot points, each pivot point being located on opposite sides of said work step.

7. The work platform of claim 1, wherein said step support mechanism is configured to support said work step in said work position by attachment to said guardrail assembly.

8. The work platform of claim 1, wherein said operator control station does not mechanically interfere with the works step when said guardrail assembly is in the raised position.

9. An aerial work platform comprising:

a self-propelled chassis;

a work platform operably supported by said chassis for elevation to a work position;

a lift mechanism associated with said chassis and operably connected to said work platform for elevating said work platform to said work elevation;

an operator control station on said work platform that is configured for moving the aerial work platform and for elevating and lowering said work platform;

a deck having a floor and a guardrail assembly, said guardrail assembly extending upward from said floor, said guardrail assembly being at least partially peripherally disposed relative to said floor, said guardrail assembly having an upper section having three sides movable between a lowered position and a raised position;

a work step associated with said guardrail assembly, said work step being movable between a storage position wherein said work step generally does not interfere with movement on said floor and a work position in which said work step is horizontally oriented above said floor so as to upwardly dispose a step surface of said work step for use thereof;

one or more pivoting devices connecting said work step to a deck attachment member associated with said guardrail assembly, said one or more pivoting device selected to pivot said work step between said storage position and said work position relative to said guardrail assembly; and a step support mechanism associated with at least one of said guardrail assembly, said floor and said work step, said step support mechanism structured and arranged to support said work step in said work position, wherein said operator control station is located entirely within said guardrail assembly when said guardrail is in said lowered position and mechanically prevents the work step pivoting to said working position.

10. The aerial work platform of claim 9, wherein said step support mechanism comprises one or more cables interconnecting guardrail assembly and said work step, each of said one or more cables being configured to flex for storage when said work step is moved from said work position to said storage position.

11. The aerial work platform of claim 9, wherein said deck is an extension deck movably supported by a main deck so as to move between a retracted position substantially enclosed by said main deck and an extended position extending outward from said main deck.

12. The aerial work platform of claim 9, wherein said work step and said upper section are cooperatively linked such that said work step cannot be moved from said storage position to said work position unless said upper section has previously been moved from said lowered position to said raised position to allow safe use of said work step.

13. The aerial work platform of claim 9, wherein said guardrail assembly is further comprised of welded vertical supports, each support spaced at least 10 inches apart along the perimeter of said floor.

* * * * *